(12) United States Patent
Lee et al.

(10) Patent No.: US 10,893,452 B2
(45) Date of Patent: *Jan. 12, 2021

(54) METHOD AND DEVICE OF RESELECTING CELL BY TERMINAL

(71) Applicant: LG ELECTRONICS INC., Seoul (KR)

(72) Inventors: Jaewook Lee, Seoul (KR); Youngdae Lee, Seoul (KR); Sunghoon Jung, Seoul (KR); Sangwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/384,493

(22) Filed: Apr. 15, 2019

(65) Prior Publication Data

US 2019/0246325 A1 Aug. 8, 2019

Related U.S. Application Data

(63) Continuation of application No. 15/557,074, filed as application No. PCT/KR2016/002358 on Mar. 9, 2016, now Pat. No. 10,292,079.

(Continued)

(51) Int. Cl.
*H04W 36/00* (2009.01)
*H04W 36/08* (2009.01)
(Continued)

(52) U.S. Cl.
CPC ........... *H04W 36/08* (2013.01); *H04W 24/08* (2013.01); *H04W 36/30* (2013.01); *H04W 48/16* (2013.01); *H04W 48/20* (2013.01)

(58) Field of Classification Search
CPC .............................. H04W 36/08; H04W 36/30
(Continued)

(56) References Cited

U.S. PATENT DOCUMENTS

2014/0098761 A1* 4/2014 Lee ...................... H04W 74/006
370/329
2014/0341059 A1* 11/2014 Jang ...................... H04W 48/06
370/252

(Continued)

FOREIGN PATENT DOCUMENTS

WO 2011093681 8/2011
WO 2014069890 5/2014

(Continued)

OTHER PUBLICATIONS

U.S. Appl. No. 15/557,074, Office Action dated Feb. 14, 2018, 13 pages.

(Continued)

*Primary Examiner* — Charles T Shedrick
(74) *Attorney, Agent, or Firm* — Lee Hong Degerman Kang Waimey

(57) ABSTRACT

Provided are a method of reselecting a cell by a terminal in a wireless communication system and a device supporting the same. A terminal may measure a cell on the basis of a priority, may calculate a ranking of the cell, using a cell measurement result, and may reselect a cell having the highest ranking. Otherwise, the terminal may measure a cell and evaluate a cell reselection criterion on the basis of a priority, may calculate a CE level with respect to a cell satisfying the cell reselection criterion evaluation, using a cell measurement result, and may reselect a cell having the lowest CE level. The terminal may be a terminal operating in a coverage extension mode and the coverage extension mode enables the cell measurement to be performed for a longer time than a normal mode.

20 Claims, 20 Drawing Sheets

Related U.S. Application Data

(60) Provisional application No. 62/130,624, filed on Mar. 10, 2015, provisional application No. 62/159,970, filed on May 12, 2015.

(51) Int. Cl.
  *H04W 24/08* (2009.01)
  *H04W 36/30* (2009.01)
  *H04W 48/16* (2009.01)
  *H04W 48/20* (2009.01)

(58) Field of Classification Search
  USPC .......................................................... 455/436
  See application file for complete search history.

(56) References Cited

U.S. PATENT DOCUMENTS

| | | | | |
|---|---|---|---|---|
| 2015/0304918 A1* | 10/2015 | Jung | ..................... | H04W 48/20 455/436 |
| 2016/0212663 A1* | 7/2016 | Uemura | ............. | H04W 36/0083 |
| 2016/0212664 A1* | 7/2016 | Uemura | ................ | H04W 24/08 |
| 2016/0337931 A1* | 11/2016 | Wang | ..................... | H04W 4/70 |
| 2016/0353342 A1* | 12/2016 | Futaki | ..................... | H04W 4/70 |
| 2017/0013551 A1* | 1/2017 | Martin | ................... | H04W 48/18 |
| 2017/0238217 A1* | 8/2017 | Futaki | ..................... | H04W 4/70 370/332 |
| 2017/0318478 A1* | 11/2017 | Basu Mallick | ......... | H04W 4/70 |
| 2018/0007597 A1* | 1/2018 | Futaki | ..................... | H04W 4/70 |
| 2018/0049087 A1 | 2/2018 | Lee et al. | | |

FOREIGN PATENT DOCUMENTS

| | | |
|---|---|---|
| WO | 2014073940 | 5/2014 |
| WO | 2014137127 | 9/2014 |

OTHER PUBLICATIONS

3rd Generation Partnership Project (3GPP), "Technical Specification Group Radio Access Network; Evolved Universal Terrestrial Radio Access (E-UTRA); User Equipment (UE) procedures in idle mode (Release 12)," 3GPP TS 36.304 V12.4.0, Mar. 2015, 38 pages.
Huawei, "Cell selection and reselection in coverage enhancement," 3GPP TSG-RAN WG2 #85, R2-140327, Feb. 2014, 5 pages.
PCT International Application No. PCT/KR2016/002358, Written Opinion of the International Searching Authority dated Jun. 29, 2016, 4 pages.

* cited by examiner

METHOD AND DEVICE OF RESELECTING CELL BY TERMINAL

CROSS-REFERENCE TO RELATED APPLICATIONS

This application is a continuation of U.S. patent application Ser. No. 15/557,074, filed on Sep. 8, 2017, now U.S. Pat. No. 10,292,079, which is the National Stage filing under 35 U.S.C. 371 of International Application No. PCT/KR2016/002358, filed on Mar. 9, 2016, which claims the benefit of U.S. Provisional Application No. 62/130,624, filed on Mar. 10, 2015 and 62/159,970, filed on May 12, 2015, the contents of which are all hereby incorporated by reference herein in their entirety.

BACKGROUND OF THE INVENTION

Field of the Invention

The present invention relates to a wireless communication system, and more particularly, to a method of reselecting a cell by a terminal in a wireless communication system, and a device supporting the method.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

A wireless communication system may need to estimate an uplink channel or downlink channel to transmit/receive data, to achieve system synchronization, and to feed back channel information. In a wireless communication system environment, fading occurs by multipath time delay. A process of recovering a transmitted signal by compensating for a signal distortion caused by drastic environmental changes by fading is referred to as channel estimation. Further, it is needed to measure a channel state with respect to a cell to which a user equipment (UE) belongs or another cell. For channel estimation or channel state measurement, channel estimation is generally performed using a reference signal (RS) known between a transmitter and a receiver.

A UE may perform measurement using the following three methods.

1) Reference signal received power (RSRP): RSRP indicates the average received power of all resource elements (REs) carrying CRSs transmitted over the entire band. Here, the UE may measure the average received power of all REs carrying channel state information (CSI) RSs instead of CRSs.

2) Received signal strength indicator (RSSI): RSSI indicates received power measured over the entire band. RSSI includes all of a signal, interference, and thermal noise.

3) Reference symbol received quality (RSRQ): RSRQ indicates a channel quality indicator (CQI) and may be determined as RSRP/RSSI depending on a bandwidth or a sub-band. That is, RSRQ refers to signal-to-interference-plus-noise-ratio (SINR). Since RSRP does not provide sufficient mobility information, RSRQ may be used instead of RSRP in a handover or cell reselection process.

RSRQ may be calculated by RSSI/RSSP. Alternatively, RSRQ may be calculated by N*RSSI/RSSP. Here, N may be a parameter (for example, the number of PRBs) or a function associated with a bandwidth in which RSSI is measured.

In recent years, machine-to-machine/Internet of Things (M2M/IoT), which connects all every objects through networks to facilitate obtaining and transmitting necessary information anytime and anywhere, thereby making it possible to offer and use various services, has become a major issue for a next-generation communication market.

While early M2M started with a sensor and an RFID network mainly for local areas, various wired/wireless networks may be used with gradually diversifying purposes and characteristics of applications. Recently, M2M based on a mobile communication network receives growing attention in view of the mobility of objects, a wide range of service areas including not only islands and mountains but also the sea, ease of network management and maintenance, security for reliable data transmission, and guarantee of service quality. Accordingly, with studies on the feasibility of M2M started in 2005, the 3GPP has been conducting a full-scale standardization project under the name "Machine Type Communications (MTC)" since 2008.

The 3GPP regards a machine as an entity that does not require direct human manipulation or intervention and defines MTC as a form of data communication involving one or more of machines. Typical examples of the machine include a smart meter and a vending machine that are equipped with a mobile communication module. Recently, with the introduction of a smart phone that performs communication by automatically connecting to a network, without any user operation or intervention, depending on a user's location or conditions, a mobile terminal having an MTC function is considered as a form of a machine. Also, a gateway-type MTC device connected to an IEEE 802.15 WPAN-based subminiature sensor or RFID is also considered.

SUMMARY OF THE INVENTION

Since the number of repetitions required for successful uplink transmission and downlink reception is not considered in a cell reselection procedure, a terminal may reselect a cell requiring a great number of repetitions in the cell reselection procedure, which may cause a problem of excessive battery consumption or the like. Therefore, the present invention proposes a method of performing cell reselection by considering not only a priority but also a coverage enhancement level or a ranking, or performing cell reselection by considering the coverage enhancement level or the ranking without consideration of the priority.

According to an embodiment, there is provided a method of reselecting a cell by a terminal in a wireless communication system. The method may include: measuring a cell on the basis of a priority; calculating a ranking of the cell by using a cell measurement result; and reselecting a cell having a highest ranking. The terminal may be a terminal operating in a coverage enhancement (CE) mode.

The cell having the highest ranking may be a cell having a highest ranking among neighboring cells having a higher ranking than a serving cell. The cell reselection may be performed during a timer duration Treselection and when one second elapses after the terminal moves to the serving cell.

In the terminal operating in the CE mode, a value calculated as a first threshold may not satisfy a cell selection condition, and a value calculated as a second threshold may satisfy the cell selection condition. The cell selection condition may be satisfied when values Srxlev and Squal exceed 0. The first threshold may be Qrxlevmin and Qqualmin for calculating the values Srxlev and Squal in normal coverage. The second threshold may be Qrxlevmin_CE and Qqualmin_CE for calculating the values Srxlev and Squal in enhanced coverage. The first threshold may be greater than the second threshold.

The cell measurement may be performed in the CE mode for a longer time than in the normal mode.

According to another embodiment, there is provided a method of reselecting a cell by a terminal in a wireless communication system. The method may include: performing cell measurement and cell reselection criterion evaluation on the basis of the priority; calculating a CE level by using a cell measurement result with respect to the cell satisfying the cell reselection criterion evaluation; and performing cell reselection on a cell having a lowest CE level.

The cell having the lowest CE may be a cell having a highest ranking.

If there is a plurality of cells having a lowest CE level, the cell having the lowest CE level may be a cell having a top frequency priority among the cells having the lowest CE level.

The CE level may be calculated on the basis of measured reference signal received quality (RSRQ) or reference signal received power (RSRP). A cell having the lowest CE level may be a cell having the best measured RSRQ or RSRP among cells satisfying the cell reselection criterion evaluation.

In case of a neighboring cell having a higher priority than the serving cell, if one second elapses after the terminal moves to the serving cell and if a value obtained by subtracting reception quality of the serving cell from reception quality of the neighboring cell is greater than a threshold Thresh,HighQ during the timer duration Treselection, then the neighboring cell may be a cell satisfying the cell reselection criterion evaluation. The timer Treselection and the threshold Thresh,HighQ may be received from the serving cell. The threshold Thresh,HighQ may be used to determine whether the neighboring cell is a cell satisfying the cell reselection criterion evaluation on the basis of reception quality of the serving cell.

In case of a neighboring cell having a higher priority than the serving cell, if one second elapses after the terminal moves to the serving cell and if a value obtained by subtracting reception quality of the serving cell from reception quality of the neighboring cell is greater than a threshold Thresh,HighP during the timer duration Treselection, then the neighboring cell may be a cell satisfying the cell reselection criterion evaluation. The timer Treselection and the threshold Thresh,HighP may be received from the serving cell. The threshold Thresh,HighP may be used to determine whether the neighboring cell is a cell satisfying the cell reselection criterion evaluation on the basis of reception quality of the serving cell.

In case of the neighboring cell having the higher priority than the serving cell, if one second elapses after the terminal moves to the serving cell and if a value obtained by subtracting the reception power of the serving cell from the reception power of the neighboring cell is greater than a threshold Thresh,HighLevel during the timer duration Treselection, then the neighboring cell may be a cell satisfying the cell reselection criterion evaluation. The timer Treselection and the threshold Thresh,HighLevel may be received from the serving cell. The threshold Thresh,HighLevel may be used to determine whether the neighboring cell is a cell satisfying the cell reselection criterion evaluation on the basis of the CE level of the serving cell.

The terminal may be a terminal operating in the CE mode. The cell measurement may be performed in the CE mode for a longer time than in the normal mode.

According to another embodiment, there is provided a terminal for reselecting a cell in a wireless communication system. The terminal may include: a memory; a transceiver, and a processor operatively coupled to the memory and the transceiver. The processor may be configured for: measuring a cell on the basis of a priority; calculating a ranking of the cell by using a cell measurement result; and reselecting a cell having a highest ranking. The terminal may be a terminal operating in a CE mode.

Since a terminal performs cell reselection by considering a coverage enhancement level or a ranking, it is possible to reselect a cell requiring a small number of repetitions.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
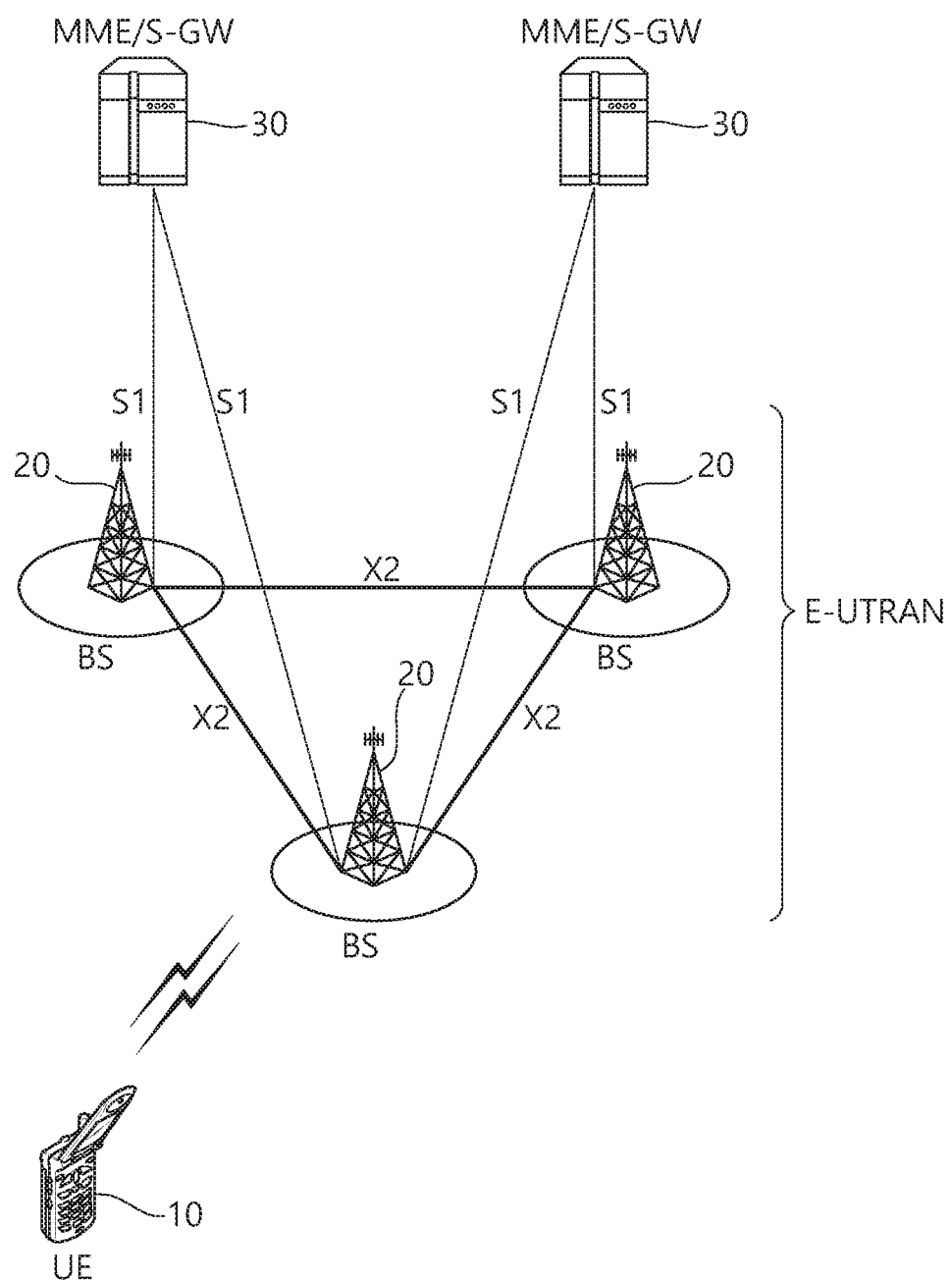
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

An E-UTRAN includes a base station (BS) 20 that provides a control plane and a user plane to a user equipment (UE) 10. The UE 10 may be fixed or mobile, and may be referred to by other name, such as a mobile station (MS), a user terminal (UT), User, a user equipment (UE), a subscriber station (SS), a wireless device, or the like. The BS 20 generally refers to a fixed station that communicates with the UE 10 and may be called by other name, such as an eNB (evolved-Node B), a BTS (Base Transceiver System), an access point, or the like.

The BSs 20 may be connected with each other via an X2 interface. The BS 20 is connected to an EPC (Evolved Packet Core) 30 via an S1 interface. Specifically, the BSs 20 are connected to an MME (Mobility Management Entity) via S1-MME and to an S-GW (Serving Gateway) via S1-U.

The EPC 30 includes an MME, an S-GW, and a P-GW (Packet Data Network-Gateway). The MME retains information regarding a UE access or information regarding UE capability, and such information is largely used to manage UE mobility. The S-GW is a gateway having an E-UTRAN as a terminal point and the P-GW is a gateway having a PDN as a terminal point.

Layers of the radio interface protocols between a UE and a network may be divided into a first layer L1, a second layer L2, and a third layer L3 based on the three lower layers of an open system interconnection (OSI) standard model widely known in communication systems. The physical layer belonging to the first layer (L1) provides an information transfer service using a physical channel, and an RRC (Radio Resource Control) layer positioned in the third layer serves to control radio resources between the UE and the network. To this end, the RRC layer exchanges an RRC message between the UE and the network.

Figure 2:
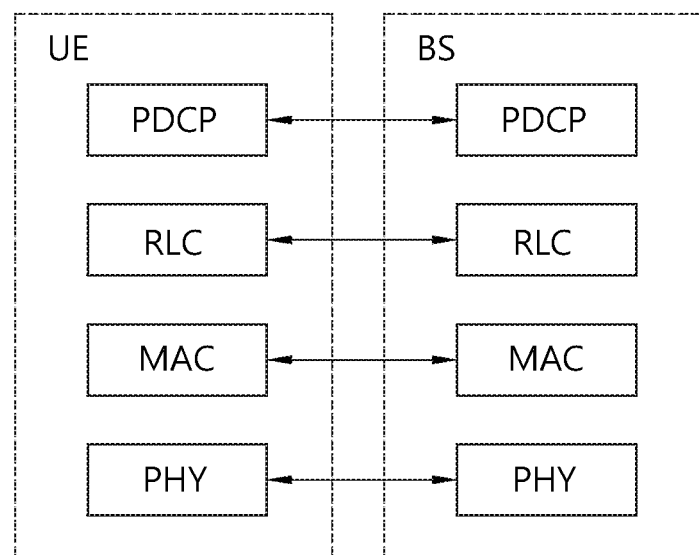
FIG. 2 shows a radio protocol architecture with respect to a user plane.
Figure 3:
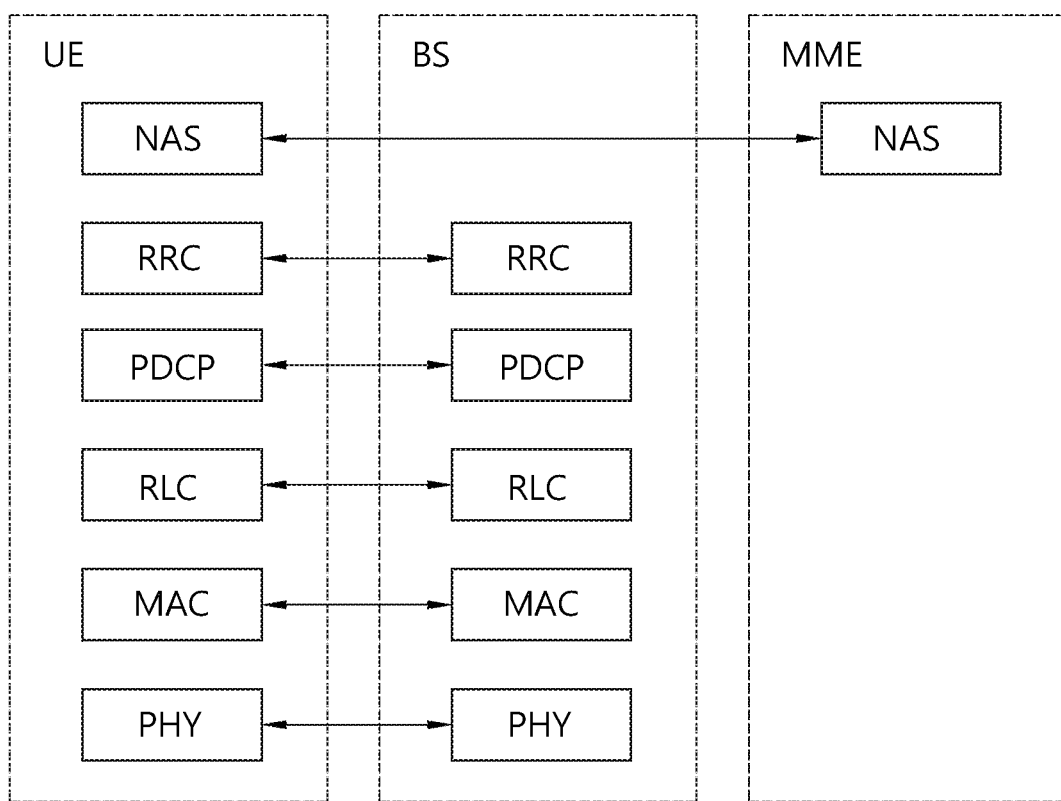
FIG. 3 shows a radio protocol architecture with respect to a control plane.

FIG. 2 shows a radio protocol architecture with respect to a user plane. FIG. 3 show a radio protocol architecture with respect to a control plane. The user plane is a protocol stack for transmitting user data, and the control plane is a protocol stack for transmitting a control signal.

Referring to FIGS. 2 and 3, the physical layer provides an information transfer service to an upper layer by using a physical channel. The physical layer is connected to a medium access control (MAC) layer via a transport channel. Data is transferred between the MAC layer and the physical layer via the transport channel Transport channels are classified depending on how and with what kind of characteristics data is transmitted through a radio interface.

Between different physical layers, namely, between physical layers of a transmitter and a receiver, data is transferred via the physical channel. The physical channel may be modulated according to an OFDM (Orthogonal Frequency Division Multiplexing) scheme, and time and frequency may be utilized as radio resources.

Functions of the MAC layer include mapping between a logical channel and a transport channel and multiplexing/demultiplexing an MAC SDU (service data unit) belonging to a logical channel into a transport block belonging to a physical channel via a transport channel. The MAC layer provides a service to an RLC (radio link control) layer through a logical channel.

Functions of the RLC layer include concatenation, segmentation, and reassembly of an RLC SDU. In order to guarantee various QoS (Quality of Service) required by a radio bearer (RB), the RLC layer provides three types of operation modes: a transparent mode (TM), an unacknowledged mode (UM), and an acknowledged mode (AM). An AM RLC provides an error correction through an ARQ (automatic repeat request).

The RRC (Radio Resource Control) layer is defined only in the control plane. The RRC layer handles controlling of a logical channel, a transport channel, and a physical channel in relation to configuration, re-configuration, and releasing of radio bearers (RBs). RB refers to a logical path provided by the first layer (PHY layer) and the second layers (MAC layer, RLC layer, and PDCP layer) to transfer data between a UE and a network.

A PDCP (Packet Data Convergence Protocol) layer in the user plane performs a transfer of a user data, header compression, and ciphering. Functions of the PDCP in the control plane include transfer of control plane data and ciphering/integrity protection.

Setting of an RB refers to defining characteristics of radio protocol layers and channels and configuring detailed parameters and operation methods to provide a particular service. RBs may be divided into two types: SRB (Signaling RB) and DRB (Data RB). The SRB is used as a passage for transmitting an RRC message on the control plane, and the DRB is used as a passage for transferring an RRC message on the user plane.

When there is an RRC connection between the RRC of the UE and that of the E-UTRAN, the UE is in an RRC-connected mode, or otherwise, the UE is in an RRC idle mode.

Downlink transport channels for transmitting data from the network to the UE includes a BCH (Broadcast Channel) for transmitting system information and a DL-SCH (Downlink-Shared Channel) for transmitting user traffic or a control message. Traffic or a control message of a downlink multicast or broadcast service may be transmitted via the DL-SCH or an extra downlink MCH (Multicast Channel). Meanwhile, uplink transport channels for transmitting data from the UE to the network includes an RACH (Random Access Channel) for transmitting an initial control message and a UL-SCH (Uplink-Shared Channel) for transmitting user traffic or a control message.

Logical channels positioned at a higher level and mapped to a transport channel includes a BCCH (Broadcast Channel), a PCCH (Paging Control Channel), a CCCH (Common Control Channel), an MCCH (Multicast Control Channel), an MTCH (Multicast Traffic Channel), or the like.

A physical channel is comprised of several OFDM symbols in a time domain and several subcarriers in a frequency domain. A single subframe includes a plurality of OFDM symbols in the time domain. A resource bock is a resource allocation unit, which includes a plurality of OFDM symbols and a plurality of subcarriers. Each subframe may use particular subcarriers of particular OFDM symbols (e.g., first OFDM symbol) of a corresponding subframe for a PDCCH (Physical Downlink Control Channel), namely, for an L1/L2 control channel. A TTI (Transmission Time Interval) is a unit time of a subframe transmission.

Hereinafter, an RRC state and an RRC connection method will be described.

An RRC state refers to whether or not an RRC layer of a UE is logically connected to that of the E-UTRAN. When the RRC layer of the UE is logically connected to that of the E-UTRAN, it is called an RRC connected state, and or otherwise, it is called an RRC idle state. When the UE is in the RRC connected state, since the RRC connection exists, the E-UTRAN can recognize the presence of the corresponding UE by cell, and thus, the E-UTRAN can effectively control the UE. Meanwhile, when the UE is in the RRC idle state, the E-UTRAN cannot recognize the UE in the RRC idle state, and the UE is managed by a core network (CN) by track area unit larger than a cell. Namely, the UE in the RRC idle state is recognized as to whether or not it is present by the larger area unit, and in order for the UE in the RRC idle state to receive a general mobile communication service such as a voice or data, the UE in the RRC idle state is to be changed to the RRC connected state.

When the user first turns on power of a UE, the UE first searches for an appropriate cell and remains in an RRC idle state in the corresponding cell. When the UE in the RRC idle state is required to be RRC connected, the UE establishes an RRC connection with the E-UTRAN through an RRC connection procedure and transitions to the RRC connection state. When the UE in the RRC idle state may need to establish an RRC connection for various reasons. For example, the UE in the RRC idle state may establish an RRC connection when a transmission of uplink data is required as the user attempts to make a call, or the like, or when a response is required to be transmitted as a paging message is received from the E-UTRAN.

A NAS (Non-Access Stratum) layer positioned at a higher level of the RRC layer performs functions such as session management, mobility management, and the like.

In order for the NAS layer to manage mobility of the UE, two states of EMM-REGISTERED (EPS Mobility Management-REGISTERED) and EMM-DEREGISTERED are defined, and these two states are applied to a UE and an MME. Initially, the UE is in the EMM-DEREGISTERED state, and in order to access a network, the UE performs a process of registering the corresponding network through an initial attach procedure. When the attach procedure is successfully performed, the UE and the MME are in the EMM-REGISTERED state.

In order to manage a signaling connection between the UE and the EPC, two states of ECM (EPS Connection Management)-IDLE and an ECM-CONNECTED state are defined, and these two states are applied to the UE and the MME. When the UE in the ECM-IDLE state establishes an RRC connection with the E-UTRAN, the corresponding UE is in the ECM-CONNECTED state. When the MME in the ECM-IDLE state establishes an S1 connection with the E-UTRAN, the MME is in an ECM-CONNECTED state. When the UE is in the ECM-IDLE state, the E-UTRAN does not have information regarding context of the UE. Thus, the UE in the ECM-IDLE state performs a UE-based mobility related procedure such as cell selection or cell reselection without receiving a command of the network. Meanwhile, when the UE is in the ECM-CONNECTED state, mobility of the UE is managed by a command of the network. In the ECM-IDLE state, when a location of the UE is changed to be different from that known by the network, the UE informs the network about its location through a tracking area updating procedure.

Figure 4:
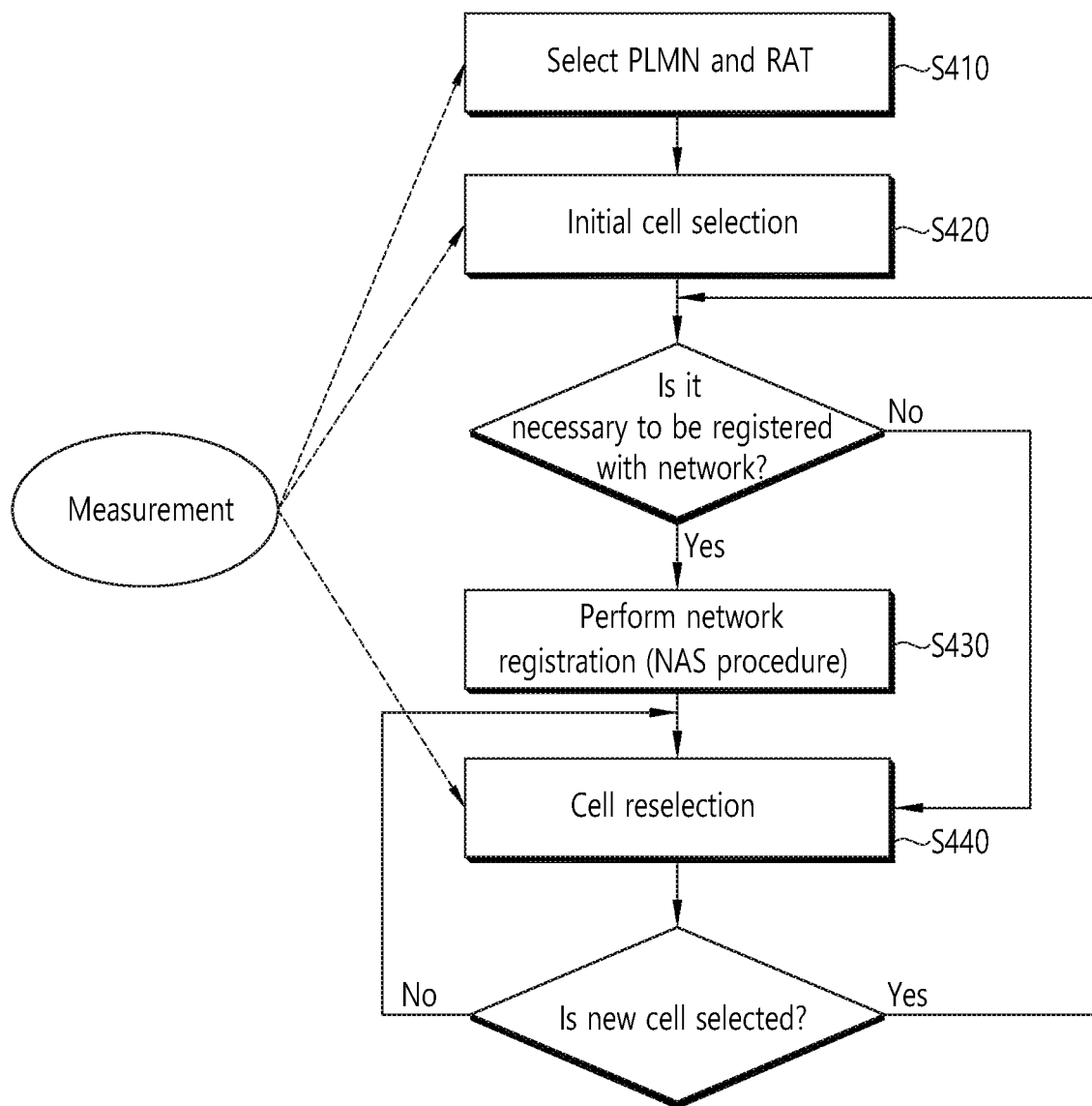
FIG. 4 shows a procedure in which UE that is initially powered on experiences a cell selection process, registers it with a network, and then performs cell reselection if necessary.

FIG. 4 shows a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
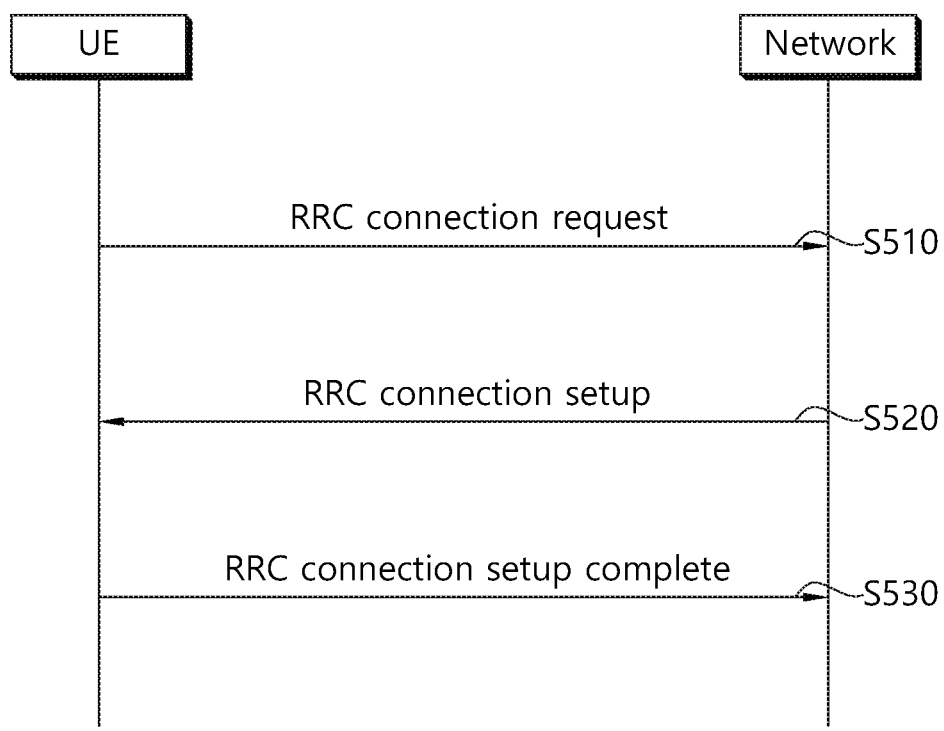
FIG. 5 shows an RRC connection establishment procedure.

FIG. 5 shows an RRC connection establishment procedure.

The UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
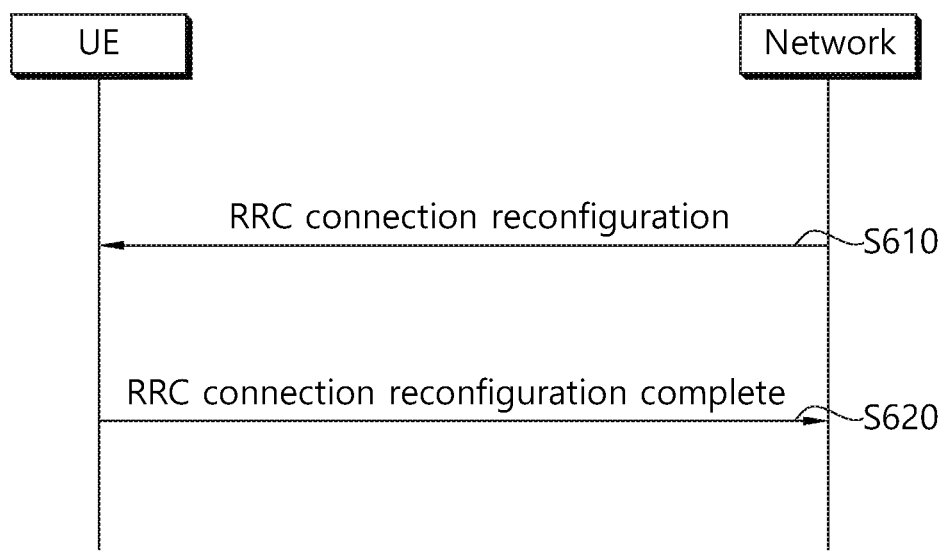
FIG. 6 shows an RRC connection reconfiguration procedure.

FIG. 6 shows an RRC connection reconfiguration procedure.

An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

Hereinafter, a method and a procedure of selecting a cell by a terminal in a 3GPP LTE is described.

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$R_S = Q_{meas,s} + Q_{hyst}, R_n = Q_{meas,n} - Q_{offset}$$ [Equation 1]

In this case, Rs is the ranking criterion of a serving cell, Rn is the ranking criterion of a neighbor cell, Qmeas,s is the quality value of the serving cell measured by UE, Qmeas,n is the quality value of the neighbor cell measured by UE, Qhyst is the hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell. If a reselected cell is not a suitable cell, UE excludes a corresponding frequency or a corresponding cell from the subject of cell reselection.

Figure 7:
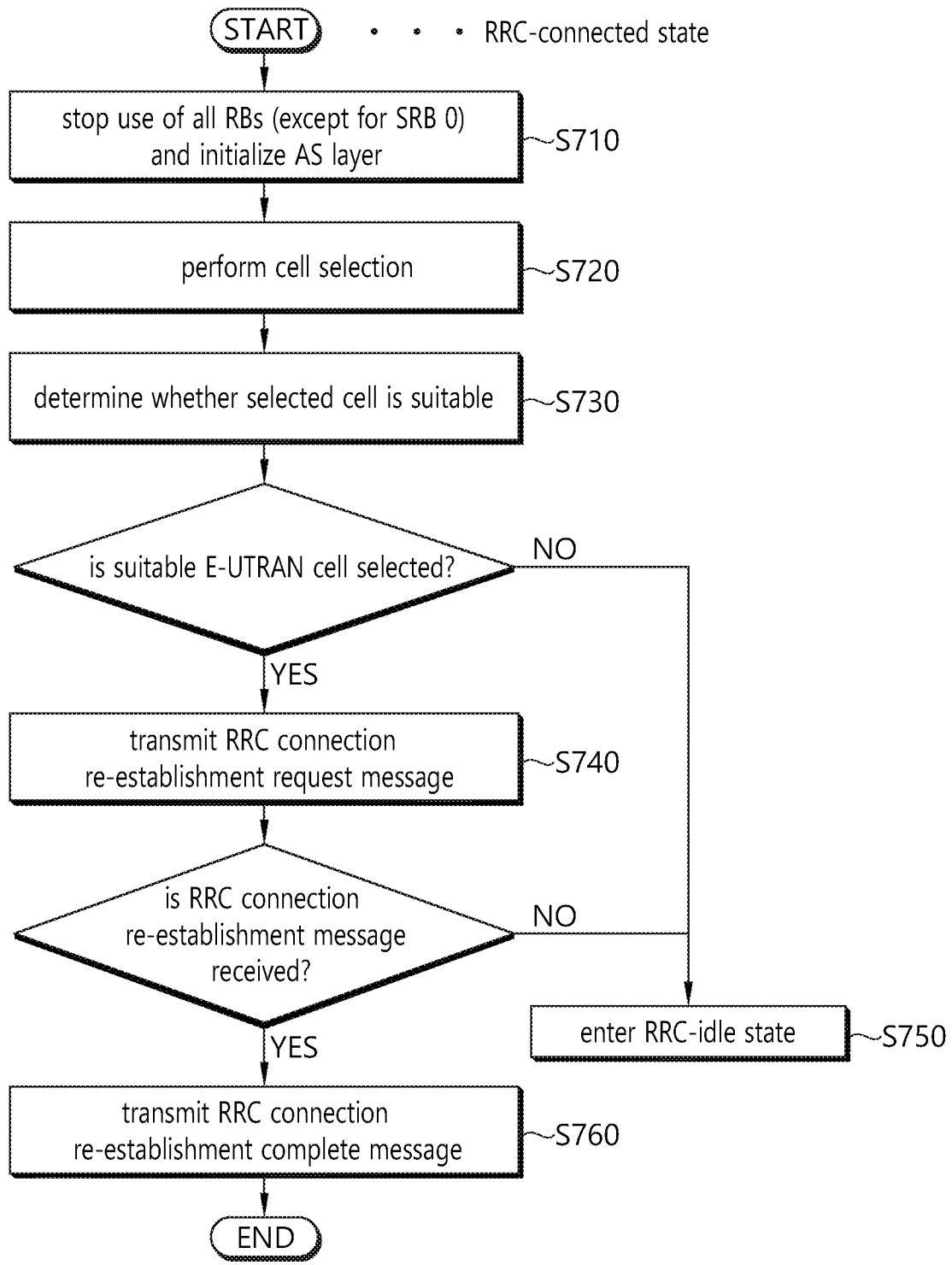
FIG. 7 shows an RRC connection re-establishment procedure.

FIG. 7 shows an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
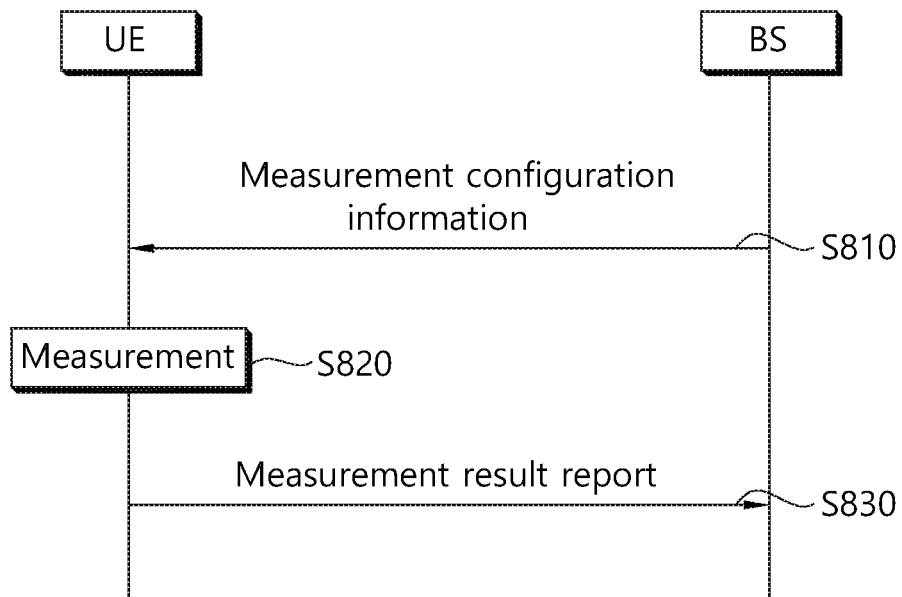
FIG. 8 shows a conventional method of performing measurement.

FIG. 8 shows a conventional method of performing measurement.

A UE receives measurement configuration information from a BS (S810). A message including the measurement configuration information is referred to as a measurement configuration message. The UE performs measurement based on the measurement configuration information (S820). If a measurement result satisfies a reporting condition included in the measurement configuration information, the UE reports the measurement result to the BS (S830). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in measurement reporting and associated information (e.g. number of cells to report).

(3) Measurement identify: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in measurement reporting. The measurement identify may be included in measurement reporting to indicate a specific measurement object for which the measurement result is obtained and a specific reporting condition according to which measurement reporting is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting are shown in the table 1. If the measurement result of the UE satisfies the determined event, the UE transmits a measurement report message to the BS.

TABLE 1

| Event | Reporting Condition |
| --- | --- |
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold1 and inter RAT neighbour becomes better than threshold2 |

Figure 9:
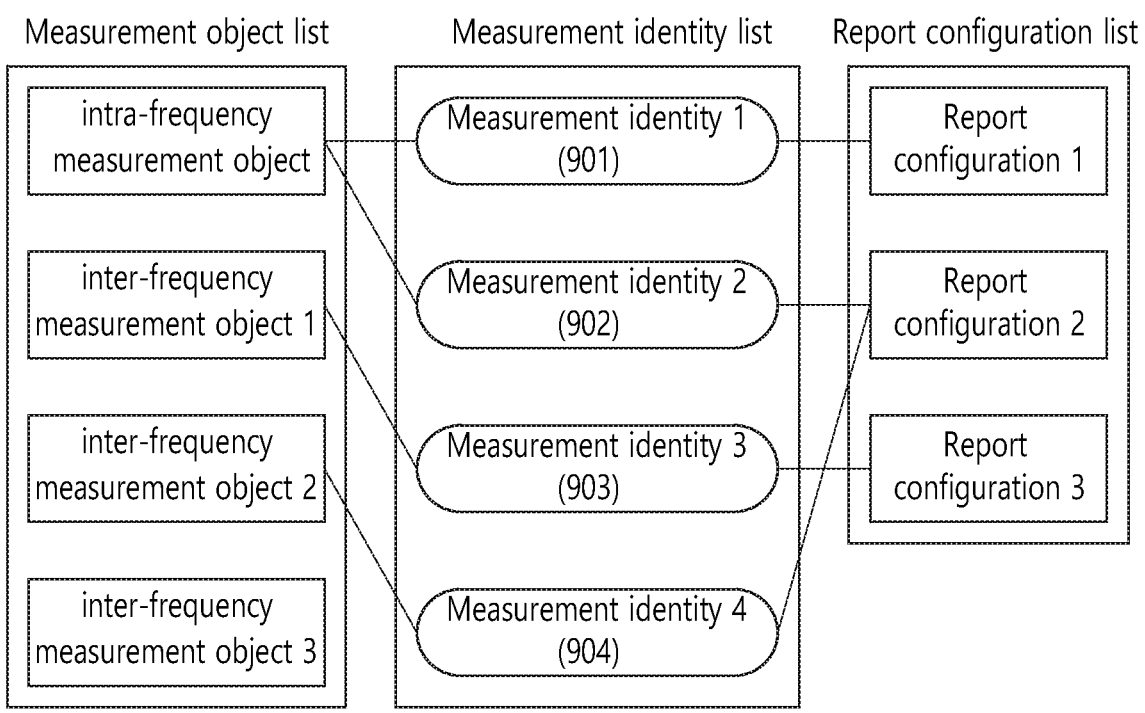
FIG. 9 shows an example of a measurement configuration assigned to a UE.

FIG. 9 shows an example of a measurement configuration assigned to a UE.

First, a measurement identity1 901 associates an intra-frequency measurement object with a reporting configuration 1. The UE performs intra-frequency measurement. The reporting configuration 1 is used to determine a reporting type and a criterion for reporting a measurement result.

A measurement identity2 902 is associated with the intra-frequency measurement object similarly to the measurement identifier1 901, and associates the intra-frequency measurement object with a reporting configuration 2. The UE performs intra-frequency measurement. The reporting configuration 2 is used to determine a reporting format and a criterion for reporting a measurement result.

By using the measurement identity1 901 and the measurement identity2 902, the UE transmits a measurement result even if the measurement result on the intra-frequency measurement object satisfies any one of the reporting configuration 1 and the reporting configuration 2.

A measurement identity3 903 associates an inter-frequency measurement object 1 with a reporting configuration 3. When a measurement result on the inter-frequency measurement object 1 satisfies a reporting criterion included in the reporting configuration 1, the UE reports the measurement result.

A measurement identity4 904 associates an inter-frequency measurement object 2 with the reporting configuration 2. When a measurement result on the inter-frequency measurement object 2 satisfies a reporting criterion included in the reporting configuration 2, the UE reports the measurement result.

Meanwhile, the measurement object, the reporting configuration, and/or the measurement identity can be added, modified, and/or deleted. To instruct such operations, the BS may transmit to the UE a new measurement configuration message or a measurement configuration modification message.

Figure 10:
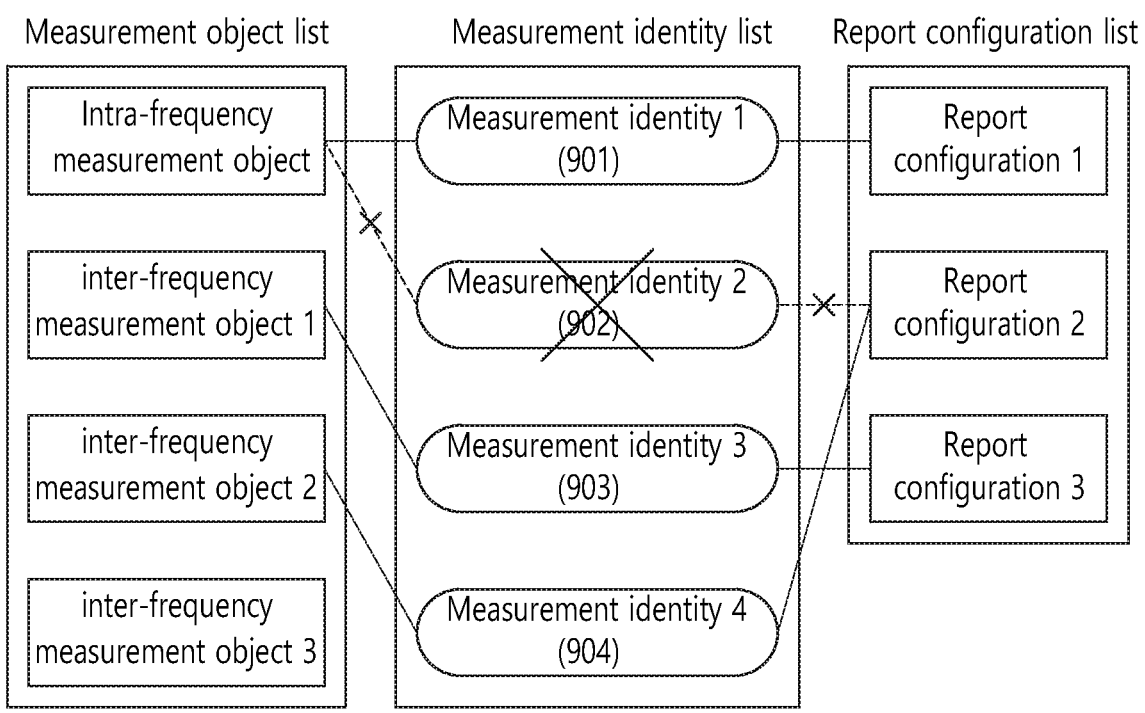
FIG. 10 shows an example of deleting a measurement identity.

FIG. 10 shows an example of deleting a measurement identity. When the measurement identity 2 902 is deleted, measurement for a measurement object associated with the measurement identity 2 902 is stopped and a measurement report is not transported. A measurement object or a reporting configuration associated with the deleted measurement identity may not be changed.

Figure 11:
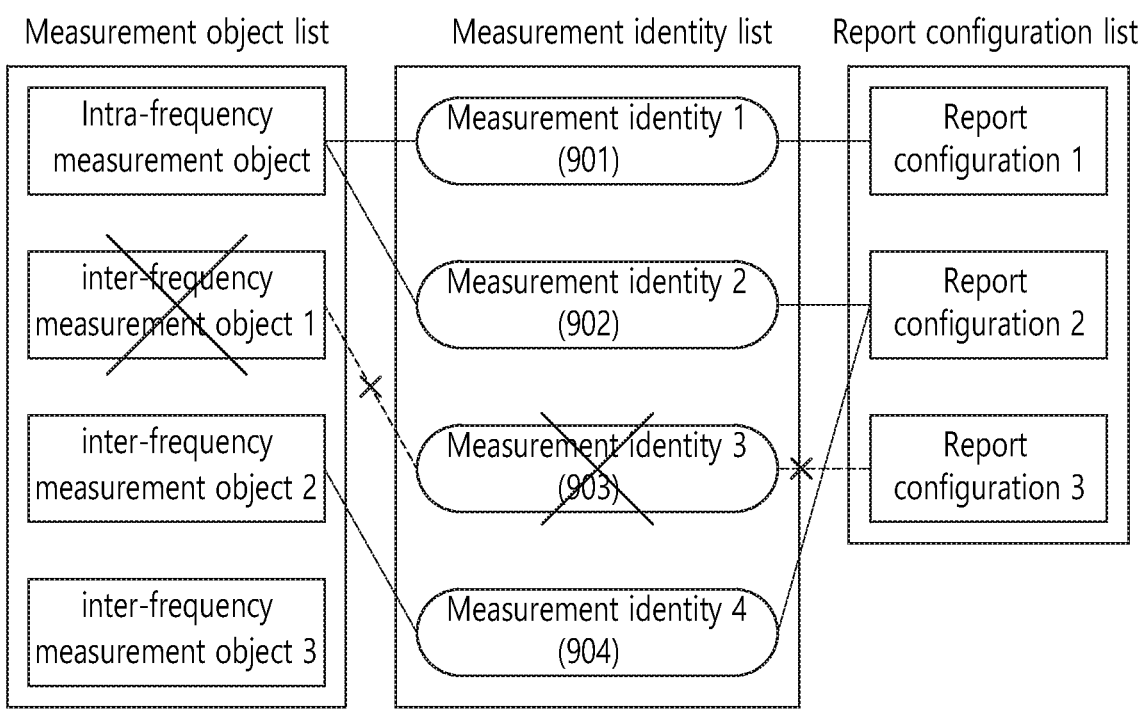
FIG. 11 shows an example of deleting the measurement object.

FIG. 11 shows an example of deleting the measurement object. When the inter-frequency measurement object 1 is deleted, the UE deletes even the measurement identity 3 903 associated therewith. Measurement for the inter-frequency measurement object 1 is stopped and a measurement report is not also transported. However, a reporting configuration associated with the deleted inter-frequency measurement object may not be changed or deleted.

When the reporting configuration is removed, the UE removes even a measurement identity associated therewith. The UE stops measurement for an associated measurement object by the associated measurement identity. However, the measurement object associated with the deleted reporting configuration may not be changed or deleted.

The measurement report may include the measurement identity, a measured quality of the serving cell, and a measurement result of the neighbor cell. The measurement identity identifies a measurement object in which the measurement report is triggered. The measurement result of the neighbor cell may include a cell identity and a measurement quality of the neighbor cell. The measured quality may include at least one of reference signal received power (RSRP) and reference signal received quality (RSRQ).

Hereinafter, an inter-frequency or inter-RAT cell reselection criterion will be described in greater detail.

Figure 12A:
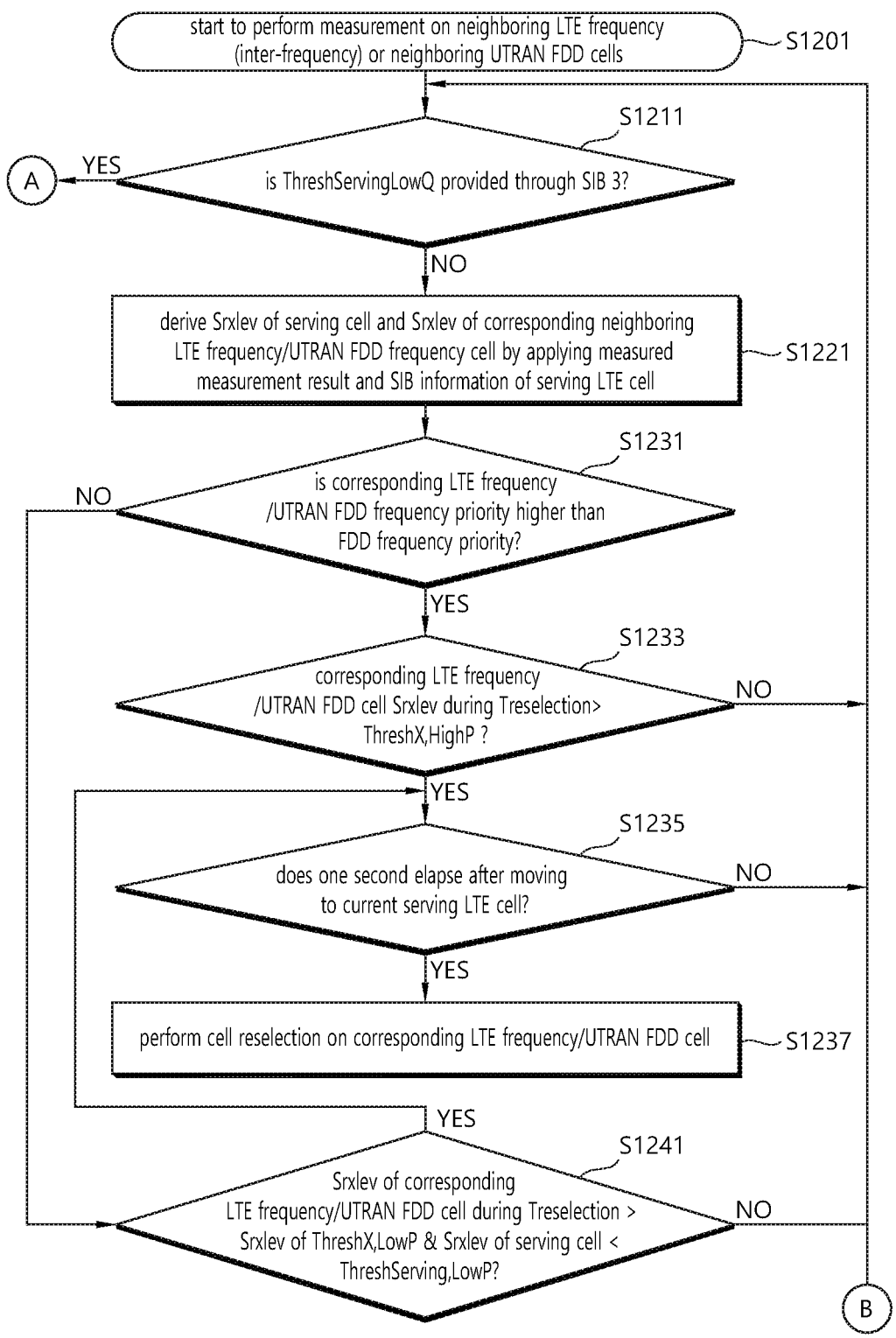
FIG. 12A and FIG. 12B show a method of (re)selecting a cell with an LTE neighboring frequency/neighboring UTRAN FDD frequency in a UE of an RRC_IDLE mode.
Figure 12B:
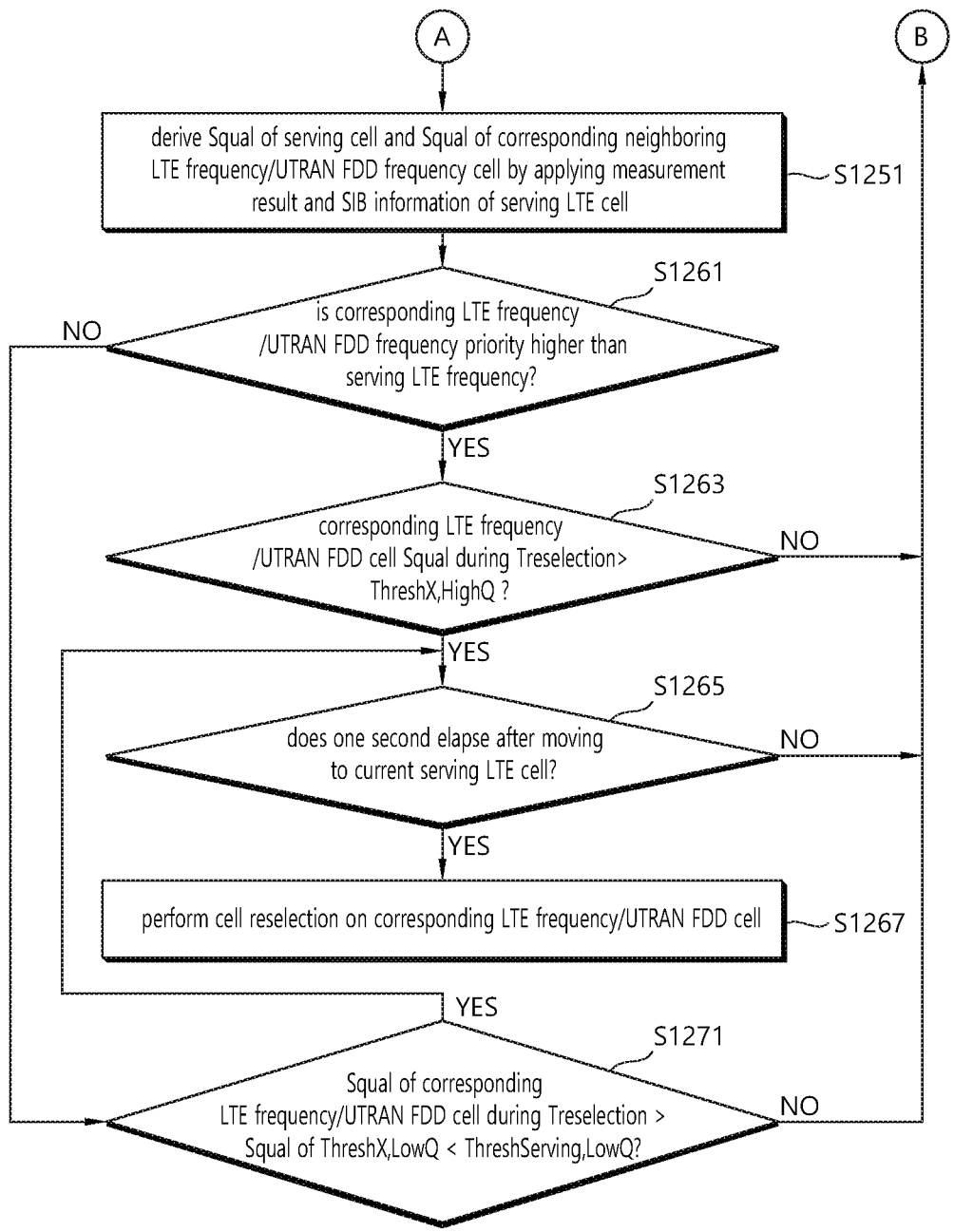

FIG. 12A and FIG. 12B show a method of (re)selecting a cell with an LTE neighboring frequency/neighboring UTRAN FDD frequency in a UE of an RRC_IDLE mode.

In a state where an RRC connection is not established with a BS for controlling a cell, the UE of the RRC_IDLE mode periodically receives some common channels such as paging to ensure mobility of the UE by selecting a proper cell according to a channel environment. The 3GPP specification of 'TS36.304 E-UTRA UE Procedures in idle mode' is used by reference for description on a detailed operation of the UE of the RRC_IDLE mode in a 3GPP system.

Referring to FIG. 12A and FIG. 12B, when the UE of the RRC_IDLE mode starts to perform measurement for cell reselection with a neighboring LTE frequency or a neighboring UTRAN FDD frequency (S1201), it is checked whether a signal quality related parameter ThreshServingLowQ is provided through system information block (SIB)

3 as one of system information which is broadcast within a cell (S1211). The signal quality related parameter ThreshServingLowQ is a comparative threshold value which is signaled through the SIB 3 to determine a channel state Squal of a current serving cell as one condition for moving to an LTE neighboring frequency or another system's frequency having a lower priority than a current serving frequency. Squal will be described at a later time. If the signal quality related parameter ThreshServingLowQ is not signaled (i.e., is not provided) through the SIB 3, a measured measurement result and system information which is broadcast in a serving LTE cell are applied to derive a value Srxlev of the serving cell and a value Srxlev of a corresponding neighboring LTE frequency/UTRAN FDD frequency cell (S1221). Srxlev denotes a cell selection RX level value (dB), and is defined as shown in Equation 2 below.

$$Srxlev=Qrxlevmeas-(Qrxlevmin+Qrxlevminoffset)-Pcompensation-Qoffsettem \quad [\text{Equation 2}]$$

Qrxlevmeas denotes a downlink reception power value used when the UE actually measures an RX channel, Qrxlevmin denotes a minimum downlink receiver power requirement level required to select a corresponding cell, Qrxlevminoffset denotes a threshold value to be added to Qrxlevmin only when the UE periodically searches for a public land mobile network (PLMN, or a communication vendor) having a higher priority while being present in a visited public land mobile network (VPLMN), Pcompensation is a threshold value considering an uplink channel state, and Qoffsettemp is an offset temporarily applied to the cell. Each parameter is described as shown in Table 2 below.

TABLE 2

| | |
|---|---|
| Srxlev | Cell selection RX level value (dB) |
| Qrxlevmeas | Measured cell RX level value (RSRP) |
| Qrxlevmin | Minimum required RX level in the cell (dBm) |
| Qrxlevminoffset | Offset to the signalled Qrxlevmin taken into account in the Srxlev evaluation as a result of a periodic search for a higher priority PLMN while camped normally in a VPLMN |
| Pcompensation | max(PEMAX − PPowerClass, 0) (dB) |
| PEMAX | Maximum TX power level a UE may use when transmitting on the uplink in the cell (dBm) defined as PEMAX in [TS 36.101] |
| PPowerClass | Maximum RF output power of the UE (dBm) according to the UE power class as defined in [TS 36.101] |
| Qoffsettemp | Offset temporarily applied to a cell as specified in [TS 36.331] |

Qrxlevmeas of a serving LTE cell and a cell of a neighboring LTE frequency is obtained as reference signal received power (RSRP), and Qrxlevmeas of a cell of a neighboring UTRAN frequency is obtained as received signal code power (RSCP). The specification 'TS36.214 E-UTRA Physical Layer Measurements' of 3GPP is used by reference for a more detailed definition on the RSRP, and the specification 'TS25.215 Physical Layer—Measurements (FDD)' of 3GPP is used by reference for a more detailed definition on the RSCP. Qrxlevmin for the serving LTE cell applies a value Q-RxLevMin received in a system information block (SIB) 3 as one of system information which is broadcast in the serving LTE. Qrxlevmin for the cell of the neighboring LTE frequency applies a value Q-RxLevMin to be mapped to a corresponding frequency received in an SIB 5 as one of system information which is broadcast in the serving LTE. Qrxlevmin for a neighboring UTRAN FDD frequency cell applies a value q-RxLevMin to be mapped to a corresponding frequency received in an SIB 6 as one of system information which is broadcast in the serving LTE cell. That is, the value Qrxlevmin may be applied as a different value to each frequency when obtaining Srxlev for the serving LTE cell, Srxlev for the cell of the neighboring LTE frequency, and Srxlev for the cell of the neighboring UTRAN FDD frequency. PEMAX applied to obtain Pcompensation denotes permitted maximum transmission power configured for a UE by a radio network controller (RNC). Similarly to Qrxlevmin, the serving LTE cell applies a value P-Max received in the SIB 3, and the cell of the neighboring LTE frequency applies a value P-Max received in the SIB 5, and the cell of the neighboring UTRAN FDD frequency applies a value P-Max received in the SIB 6. Ppowerclass denotes actual maximum RF transmission power of the UE. The value Ppowerclass may have a different value for each class of the UE.

The UE checks whether a neighboring LTE frequency/UTRAN FDD frequency to be measured has a higher priority than the serving LTE frequency (S1231). The priority information indicates a specific frequency which is considered preferentially by the UE to perform cell reselection thereon, and may be received as system information which is broadcast in the serving LTE cell or a dedicated message (e.g., an RRC connection release) when the UE is in the RRC connected state.

If the neighboring LTE frequency/UTRAN FDD frequency to be measured has a higher priority than the current serving LTE frequency (S1231), if the value Srxlev of the cell of the neighboring LTE frequency/UTRAN FDD frequency is higher than a value ThreshX,HighP during a timer duration Treselection (S1233), and if one second elapses after moving to the current serving LTE cell (S1235), then cell reselection is performed on a cell of a corresponding neighboring LTE frequency/UTRAN FDD frequency (S1237). The timer value Treselection to be applied to the neighboring LTE frequency/UTRAN FDD frequency and a comparative threshold value ThreshX,HighP Srxlev are received as system information which is broadcast in the serving LTE cell.

Meanwhile, if the neighboring LTE frequency/UTRAN FDD frequency to be measured is not higher than (i.e., equal to or lower than) the current serving LTE frequency (S1231), if the value Srxlev of the cell of the neighboring LTE frequency/UTRAN FDD frequency is higher than a value ThreshX,LowP and the value Srxlev of the serving cell of the current LTE frequency is less than a value ThreshServing,LowP during the time duration Treselection (S1241), and if one second elapses after moving to the current serving LTE cell (S1235), then cell reselection is performed on a cell of a corresponding neighboring LTE frequency/UTRAN FDD frequency (S1237). If the above condition is not satisfied, the cell reselection does not occur with the neighboring LTE frequency/UTRAN FDD frequency.

If the value ThreshServingLowQ is signaled/provided through the SIB 3 of the serving LTE cell (S1211), the measured measurement result and the system information which is broadcast in the serving LTE cell are applied to derive a value Squal of the serving cell and a value Squal of a corresponding neighboring LTE frequency/UTRAN FDD frequency cell (S1251). Squal denotes a cell selection quality value (dB), and is defined as shown in Equation 3 below.

$$Squal=Qqualmeas-(Qqualmin+Qqualminoffset)-Qoffsettemp \quad [\text{Equation 3}]$$

Qqualmeas denotes a value obtained by calculating a ratio of received signal strength used when the UE actually measures a downlink RX channel and total noise actually measured. Qqualmin a minimum signal to noise ratio level required to select a corresponding cell. Qqualminoffset denotes a threshold value to be added to Qqualmin only when the UE periodically searches for a PLMN having a higher priority while being present in a VPLMN, and Qoffsettemp is an offset temporarily applied to the cell. Each parameter is described as shown in Table 3 below.

TABLE 3

| | |
|---|---|
| Squal | Cell selection quality value (dB) |
| Qqualmeas | Measured cell quality value (RSRQ) |
| Qqualmin | Minimum required quality level in the cell (dB) |
| Qqualminoffset | Offset to the signalled Qqualmin taken into account in the Squal evaluation as a result of a periodic search for a higher priority PLMN while camped normally in a VPLMN |
| Qoffsettemp | Offset temporarily applied to a cell as specified in [TS 36.331] |

Qqualmeas of a serving LTE cell and a cell of a neighboring LTE frequency is obtained as reference signal received quality (RSRQ), and Qqualmeas of a cell of a neighboring UTRAN frequency is obtained as Ec/No (obtained as RSCP/RSSI, RSSI: Received Signal Strength Indicator). The specification 'TS36.214 E-UTRA Physical Layer Measurements' of 3GPP is used by reference for a more detailed definition on the RSRQ, and the specification 'TS25.215 Physical Layer—Measurements (FDD)' of 3GPP is used by reference for a more detailed definition on the Ec/No. Qqualmin for the serving LTE cell applies a value Q-QualMin-r9 received in an SIB 3 as one of system information which is broadcast in the serving LTE. Qqualmin for the cell of the neighboring LTE frequency applies a value Q-QualMin-r9 to be mapped to a corresponding frequency received in an SIB 5 as one of system information which is broadcast in the serving LTE. Qqualmin for a neighboring UTRAN FDD frequency cell applies a value q-QualMin to be mapped to a corresponding frequency received in an SIB 6 as one of system information which is broadcast in the serving LTE cell. That is, the value Qqualmin may be applied as a different value to each frequency when obtaining Squal for the serving LTE cell, Squal for the cell of the neighboring LTE frequency, and Squal for the cell of the neighboring UTRAN FDD frequency.

The UE checks whether a neighboring LTE frequency/UTRAN FDD frequency to be measured has a higher priority than the serving LTE frequency (S1261). The priority information indicates a specific frequency which is considered preferentially by the UE to perform cell reselection thereon, and may be received as system information which is broadcast in the serving LTE cell or a dedicated message (e.g., an RRC connection release) when the UE is in the RRC connected state.

If the neighboring LTE frequency/UTRAN FDD frequency to be measured has a higher priority than the current serving LTE frequency (S1261), if the value Srxlev of the cell of the neighboring LTE frequency/UTRAN FDD frequency is higher than a value ThreshX,HighQ during a timer duration Treselection (S1263), and if one second elapses after moving to the current serving LTE cell (S1265), then cell reselection is performed on a cell of a corresponding neighboring LTE frequency/UTRAN FDD frequency (S1267). The timer value Treselection to be applied to the neighboring LTE frequency/UTRAN FDD frequency and a comparative threshold value ThreshX,HighQ Srxlev are received as system information which is broadcast in the serving LTE cell.

Meanwhile, if the neighboring LTE frequency/UTRAN FDD frequency to be measured is not higher than (i.e., equal to or lower than) the current serving LTE frequency (S1261), if the value Srxlev of the cell of the neighboring LTE frequency/UTRAN FDD frequency is higher than a value ThreshX,LowQ and the value Srxlev of the serving cell of the current LTE frequency is less than a value ThreshServing,LowQ during the time duration Treselection (S1271), and if one second elapses after moving to the current serving LTE cell (S1265), then cell reselection is performed on a cell of a corresponding neighboring LTE frequency/UTRAN FDD frequency (S1267). If the above condition is not satisfied, the cell reselection does not occur with the neighboring LTE frequency/UTRAN FDD frequency.

Further, the UE may search for a closed subscriber group (CSG) cell including the UE as its member during the normal cell reselection procedure. If a CSG cell suitable for another frequency is discovered, cell reselection is performed on the CSG cell regardless of a priority of a frequency at which the UE currently resides. That is, the CSG cell has a top priority in the cell reselection.

Meanwhile, among UEs, a UE for receiving a multimedia broadcast and multicast service (MBMS) service may assign the top priority to a currently served frequency. Further, among the UEs, UEs intending to receive an MBMS service may assign the top priority to a frequency at which the MBMS service is broadcast. In addition, a UE which is no longer able to receive a service at a corresponding frequency or which has completed the service may not regulate a priority for the frequency at which the MBMS service is received.

Hereinafter, a cell selection criterion S will be described in greater detail.

The cell selection criterion used by a UE in cell selection is defined as shown in Equation 4 below.

$$\text{Srxlev} > 0 \text{ and } \text{Squal} > 0 \qquad \text{[Equation 4]}$$

Srxlev is defined as shown in Equation 2 above, and Squal is defined as shown in Equation 3 above. Referring to Equation 4 above, the cell selection criterion may be satisfied when both of Srxlev and Squal are greater than 0. That is, when both of the RSRP and RSRQ of the measured cell are greater than or equal to a specific level, the UE may determine the cell as a cell having a basic possibility for cell reselection. In particular, Squal is a parameter corresponding to the RSRQ. That is, Squal is a value calculated in association with quality of power rather than simply a value associated with a magnitude of power measured in the cell. The cell selection criterion may be satisfied in terms of quality of the cell if Squal>0. The cell selection criterion for the RSRQ may be satisfied only when the measured RSRQ is greater than or equal to a sum of Qqualmin and Qqualminoffset.

Hereinafter, machine-type communication (MTC) will be described.

Figure 13:
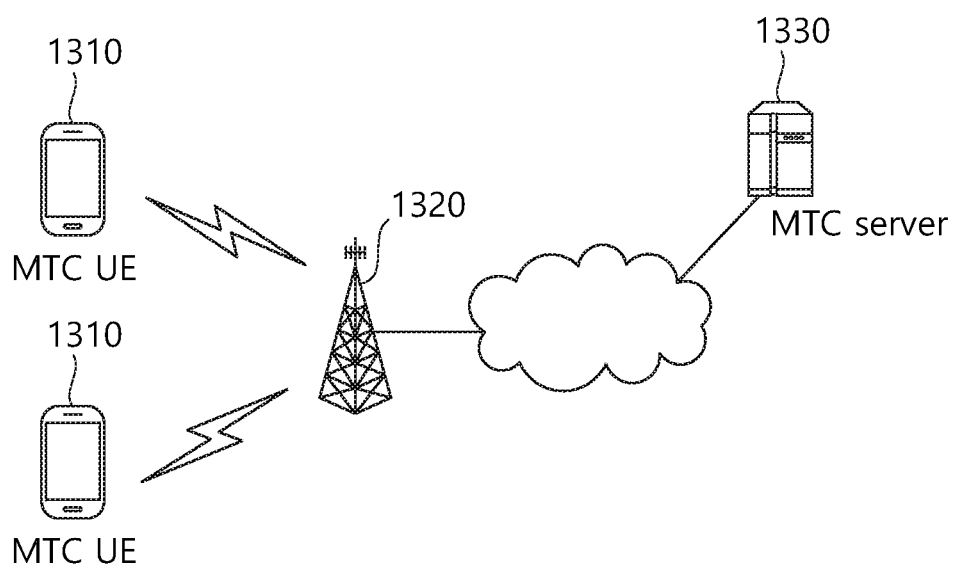
FIG. 13 shows an example of MTC.

FIG. 13 shows an example of MTC.

MTC refers to information exchange between MTC UEs 1310 via a BS 1320 without involving human interactions or information exchanges between an MTC UE 1310 and an MTC server 1330 via the BS. Services provided through MTC are differentiated from existing communication services requiring human intervention, and MTC provides a wide range of services, such as tracking, metering, payment, medical services, remote control, and the like. More specifically, services provided through MTC may include reading a meter, measuring a water level, utilizing a surveillance camera, reporting the inventory of a vending machine, and the like. Data communication-oriented low-cost/low-specification UEs that provide these services are referred to as an MTC UE or low complexity-type UE for convenience. A BS may determine whether a UE is an MTC UE based on the capability of the UE. In the present specification, an MTC UE, a low-complexity UE, a low-cost UE, and a UE Category 0 UE may be used with the same meaning, and a normal UE may be used to refer to a UE other than the listed UEs.

The MTC server 1330 is an entity communicating with the MTC UE 1310. The MTC server 1330 runs an MTC application and provides an MTC-specific service to an MTC device. The MTC UE 1310 is a wireless device that provides MTC communication and may be fixed or mobile.

Since an MTC UE has a small amount of data to transmit and is occasionally involved in uplink/downlink data transmission/reception, it is effective to reduce the cost of the UE and to decrease battery consumption thereof according to a low data transmission rate. The MTC UE is characterized by low mobility and thus has a hardly changing channel environment.

The MTC UE does not require a high-performance function and generally uses a small amount of data. The concept of UE Category 0 is introduced in order to manufacture a low-cost MTC UE. A UE category is a general number used in the 3GPP to indicate how much data a UE can process in a communication modem. Table 4 shows 3GPP UE categories.

TABLE 4

| UE Category | DL speed | UL speed | UE Category | DL speed | UL speed |
|---|---|---|---|---|---|
| 0 | 1 Mbps | 1 Mbps | 7 | 300 Mbps | 100 Mbps |
| 1 | 10 Mbps | 5 Mbps | 8 | 3 Gbps | 1.5 Gbps |
| 2 | 50 Mbps | 25 Mbps | 9 | 450 Mbps | 50 Mbps |
| 3 | 100 Mbps | 50 Mbps | 10 | 450 Mbps | 100 Mbps |
| 4 | 150 Mbps | 50 Mbps | 11 | 600 Mbps | 50 Mbps |
| 5 | 300 Mbps | 75 Mbps | 12 | 600 Mbps | 100 Mbps |
| 6 | 300 Mbps | 50 Mbps | 13 | 400 Mbps | 50 Mbps |

A UE Category 0 UE is allowed to process only 1 Mbps, making it possible to manufacture a modem without much effort and high costs, and may use only one antenna. Also, the UE Category 0 UE is allowed to perform transmission or reception only in a specified time, rather than simultaneously performing transmission and reception, and thus may operate in FDD in the same manner as in TDD. In addition, unlike in existing TDD, a sufficient switching time of about 1 ms may be assigned for a period of transition between transmission and reception, thereby remarkably reducing costs for hardware components, particularly in view of a modem and RF, overall.

MTC UEs may be installed not only in buildings and factories but also in coverage-limited places, for example, a basement. For instance, about 20% of MTC UEs supporting an MTC service, such as smart metering, may be installed in a poor 'deep indoor' environment, such as a basement. Thus, for successful MTC data transmission, it is necessary to increase the coverage of an MTC UE by about 20 dB as compared with the coverage of a conventional normal UE. Considering this situation, various coverage enhancement techniques are currently under discussion, such as a repetitive transmission method for an MTC UE by each channel/signal.

Figure 14:
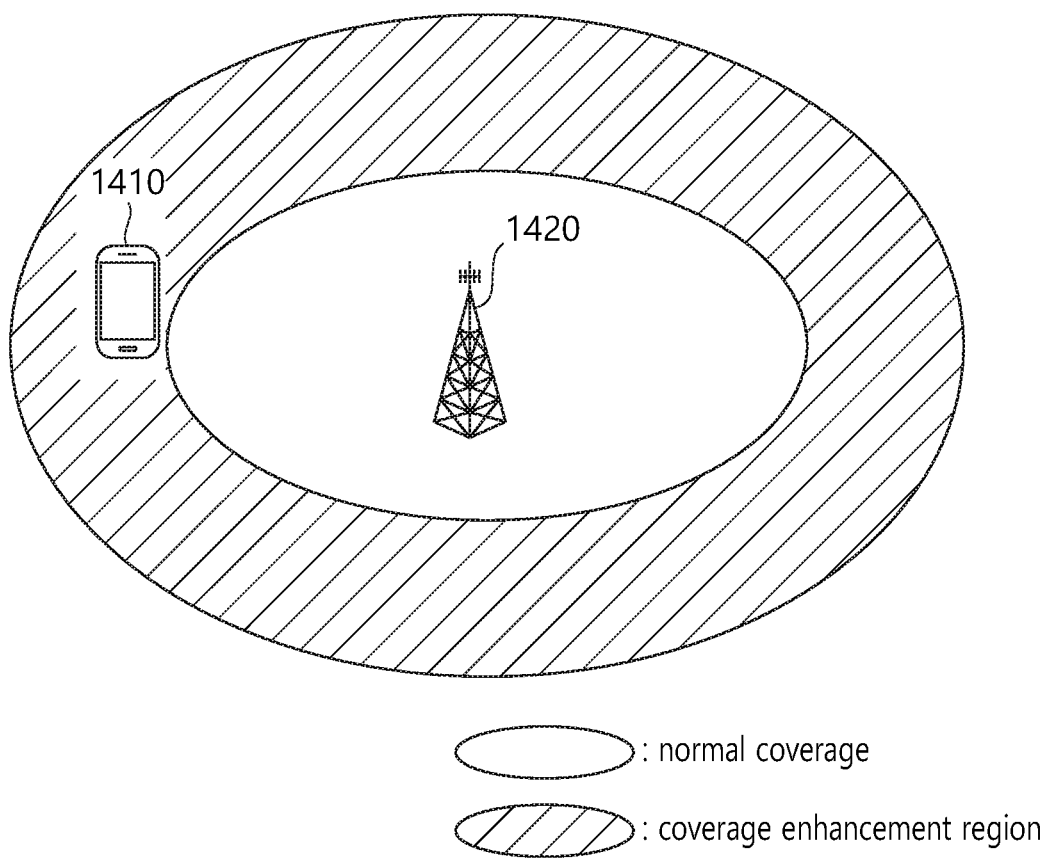
FIG. 14 shows an example of cell coverage enhancement for an MTC device.

FIG. 14 shows an example of cell coverage enhancement for an MTC device.

As described above, recently, there is ongoing discussion about various coverage enhancement schemes such as a repetitive transmission method for an MTC UE for each channel/signal. The coverage enhancement scheme may also be applied not only to the MTC UE but also to a normal UE. That is, a UE 1410 located in a coverage enhancement region of FIG. 14 may be a normal UE or an MTC UE. According to a UE location in a cell and signal quality of the UE in the cell, a coverage enhancement level (hereinafter, CE level) may differ. A difference of the CE level implies that there is a difference in the number of repetitions (resources, subframes) required for uplink transmission and downlink reception. From a UE perspective, it is more preferable to reside in a cell requiring a small number of repetitions for successful uplink transmission and downlink reception in terms of power consumption. The small number of repetitions for the successful uplink transmission and downlink reception may be further required particularly for the MTC UE. From a network perspective, likewise, it is more preferable to serve for the UE requiring the small number of repetitions. However, as described above in the cell reselection procedure, the number of repetitions required for the successful uplink transmission and downlink reception is not considered in the cell reselection procedure. Consequently, it may result in reselecting of a cell requiring a great number of repetitions, which may lead to a great amount of battery consumption. Although it is mentioned for clarity of the explanation that the small number of repetitions for the successful uplink transmission and downlink reception is more required particularly for the MTC device, the technical aspect of the present invention is not limited to the MTC UE, and may also be applied to a normal UE located in a coverage enhancement region.

To solve the aforementioned problem, the present invention proposes a cell reselection method considering a CE level or a ranking. It is assumed in the present invention that a plurality of CE levels are present for measurement including a level corresponding to a case of not having coverage enhancement. According to the CE level, it is assumed that there is a difference in the number of repetitions required for the successful uplink transmission and downlink reception. The number of repetitions may be an amount of resources required for the successful uplink transmission and downlink reception, and may be the number of subframes required for successful uplink transmission and downlink reception. A CE level 0 may correspond to a case of not having coverage enhancement, and the number of repetitions, the amount of resources, or the number of subframes required for the successful uplink transmission and downlink reception may be increased in proportion to an increase in the CE level.

First, a method of determining whether a UE is a normal mode or a CE mode is described in the present invention.

According to whether the UE is in the normal mode or the CE mode, the cell selection criterion described in Equation 4 may be applied differently. The UE of the normal mode implies a UE in normal coverage, and the UE in the CE mode implies a UE in enhanced coverage.

If Srxlev of Equation 2 and Squal of Equation 3 calculated using a first threshold satisfy a cell selection condition of Equation 4, it may be determined that the UE is in a state of the normal mode. The first threshold may be Qrxlevmin or Qqualmin. That is, if cell quality is greater than or equal to a predefined level and thus successful transmission/reception is possible even if the number of repetitions for transmitting/receiving data/signals or the like with respect to a BS is not greater than or equal to a predefined level, it may be determined that the UE is in the state of the normal mode.

Meanwhile, if Srxlev of Equation 2 and Squal of Equation 3 calculated using the first threshold do not satisfy the cell selection condition of Equation 4 but satisfy Srxlev of Equation 2 and Squal of Equation 3 calculated using a second threshold satisfy the cell selection condition of Equation 4, it may be determined that the UE is in the state of the CE mode. The second threshold may be Qrxlevmin_CE or Qqualmin_CE. Qrxlevmin_CE and Qqualmin_CE may be defined as shown in Table 5 below. That is, if the cell quality does not satisfy the predetermined criterion and thus successful transmission/reception is possible even if the number of repetitions for transmitting/receiving data/signals or the like with respect to the BS is greater than or equal to a predefined level, it may be determined that the UE is in the state of the CE mode. In case of the UE in the enhanced coverage, Qrxlevmin_CE and Qqualmin_CE may be used instead of Qrxlevmin and Qqualmin predefined to calculate Srxlev of Equation 2 and Squal of Equation 3. That is, Qrxlevmin_CE and Qqualmin_CE may be defined as shown in Table 5 below.

| Qrxlevmin | UE applies coverage-specific value Qrxlevmin_CE (dBm) |
| Qqualmin | UE applies coverage-specific value Qqualmin_CE (dB) |

The UE supporting the CE mode may transition between the CE mode and the normal mode according to a channel situation with respect to a cell.

Next, a method of determining a CE level is described in the present invention. In the present invention, a UE may determine a CE level for transmission/reception in a specific cell by using a method described below, and each threshold may be provided by a serving cell.

(1) RSRP/RSRQ-based CE level determination: The UE may determine the CE level of the cell by comparing a measured RSRP/RSRQ result and a predetermined threshold.

In order for the UE to determine a CE level in a specific cell, a network may configure an RSRP/RSRQ threshold for one or more CE levels. For example, the network may signal an RSRP/RSRQ threshold 0 for a CE level 0, an RSRP/RSRQ threshold 1 for a CE level 1, an RSRP/RSRQ threshold 2 for a CE level 2, and an RSRP/RSRQ threshold 3 for a CE level 3. The level 0 implies that there is no coverage enhancement for measurement.

While performing measurement on a serving cell and a neighboring cell, the UE may determine a CE level by comparing the threshold configured by the network and an RSRP/RSRQ result measured by the UE. If the measurement result is higher than the RSRP/RSRQ threshold 0, the UE may determine the CE level to 0. If the measurement result is lower than the RSRP/RSRQ threshold 0 and higher than the RSRP/RSRQ threshold 1, the UE may determine the CE level to 1. If the measurement result is lower than the RSRP/RSRQ threshold 1 and higher than the RSRP/RSRQ threshold 2, the UE may determine the CE level to 2. Likewise, if the measurement result is lower than the RSRP/RSRQ threshold 2 and higher than the RSRP/RSRQ threshold 3, the UE may determine the CE level to 3.

(2) Primary synchronization signal (PSS)/secondary synchronization signal (SSS)-based CE level determination: The UE may determine the CE level of the cell by comparing a time for acquiring PSS/SSS and a predetermined threshold.

In order for the UE to determine a CE level in a specific cell, a network may configure an RSRP/RSRQ threshold for one or more CE levels. For example, the network may signal a time threshold 0 for a CE level 0, a time threshold 1 for a CE level 1, a time threshold 2 for a CE level 2, and a time threshold 3 for a CE level 3. The level 0 implies that there is no coverage enhancement for measurement.

While performing measurement on a serving cell and a neighboring cell, the UE may determine a CE level by comparing a time threshold configured by the network and a time for acquiring the PSS/SSS. If the time for acquiring the PSS/SSS is shorter than a time threshold 0, the UE may determine the CE level to 0. If the time for acquiring the PSS/SSS is longer than a time threshold 0 and shorter than a time threshold 1, the UE may determine the CE level to 1. If the time for acquiring the PSS/SSS is longer than a time threshold 1 and shorter than a time threshold 2, the UE may determine the CE level to 2. If the time for acquiring the PSS/SSS is longer than a time threshold 2 and shorter than a time threshold 3, the UE may determine the CE level to 3.

(3) Downlink message-based CE level determination: The UE may determine the CE level of the cell by comparing the number of repetitions required to successfully receive a certain downlink message and a predetermined threshold.

(4) Uplink message-based CE level determination: The UE may determine the CE level of the cell by comparing the number of repetitions required to successfully receive a certain uplink message and a predetermined threshold.

Although it is assumed in the embodiment of the present invention that the CE level can be configured from 0 to 3, this means that one or more levels can be configured, and the present invention is not limited thereto.

Next, a cell reselection method proposed in the present invention is described. Proposed are a first method considering not only a priority but also a CE level in cell reselection, a second method considering serving cell quality or the like in cell reselection, and a third method considering only a ranking without consideration of the priority in cell reselection. Hereinafter, each method is described in detail.

1. The first method may consider not only a frequency priority but also a CE level in a cell reselection procedure.

(1) Step 1: The UE may perform the cell reselection procedure by considering a priority according to the conventional cell reselection criterion evaluation. According to the conventional cell reselection criterion evaluation, the CE level is not considered in the cell reselection criterion evaluation. The conventional cell reselection evaluation has already been described above by using FIG. 12.

(2) Step 2: For one or more cells satisfying the criterion of Step 1, the UE may perform cell reselection with an RAT/frequency required to have a minimum number of repetitions. That is, the UE may perform cell reselection on a cell having a lowest CE level among the cells satisfying the criterion of Step 1. Alternatively, the UE may perform cell reselection on a cell having a highest ranking among the cells satisfying the criterion of Step 1.

Figure 15:
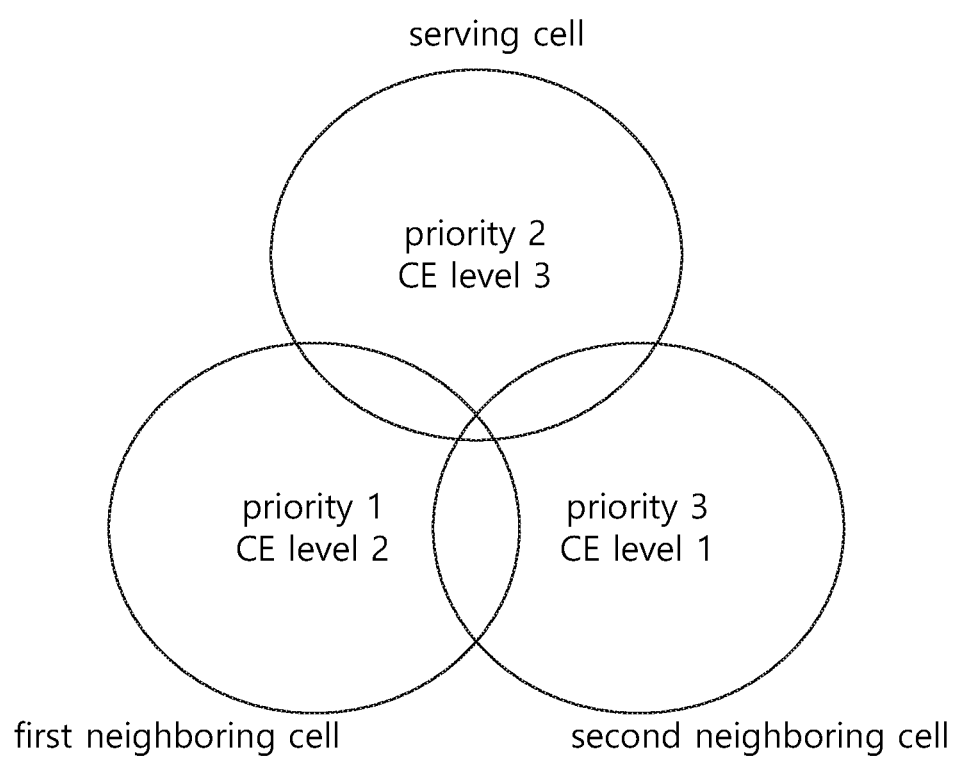
FIG. 15 shows an example of a cell reselection method considering a CE level.

Referring to FIG. 15, there are one serving cell and two neighboring cells. It is assumed that a first neighboring cell has a higher priority than a serving cell, whereas a second neighboring cell has a lower priority than the serving cell. In addition, it is assumed that a CE level is 3 as a result of measuring the serving cell, is 2 as a result of measuring the first neighboring cell, and is 1 as a result of measuring the second neighboring cell. In addition, it is assumed that the serving cell, the first neighboring cell, and the second neighboring cell satisfy the condition of Step 1. In this embodiment, although cell reselection is performed on the first neighboring cell having a top priority according to the conventional cell reselection procedure, cell reselection is performed on the second neighboring cell having a lowest CE level in the present invention. That is, a cell of a frequency having a low priority may be selected.

(3) Step 3: If there is a plurality of different cells satisfying the criterion of Step 2, cell reselection with an RAT/frequency having a high priority may be preferential over cell reselection with an RAT/frequency having a low priority.

Figure 16:
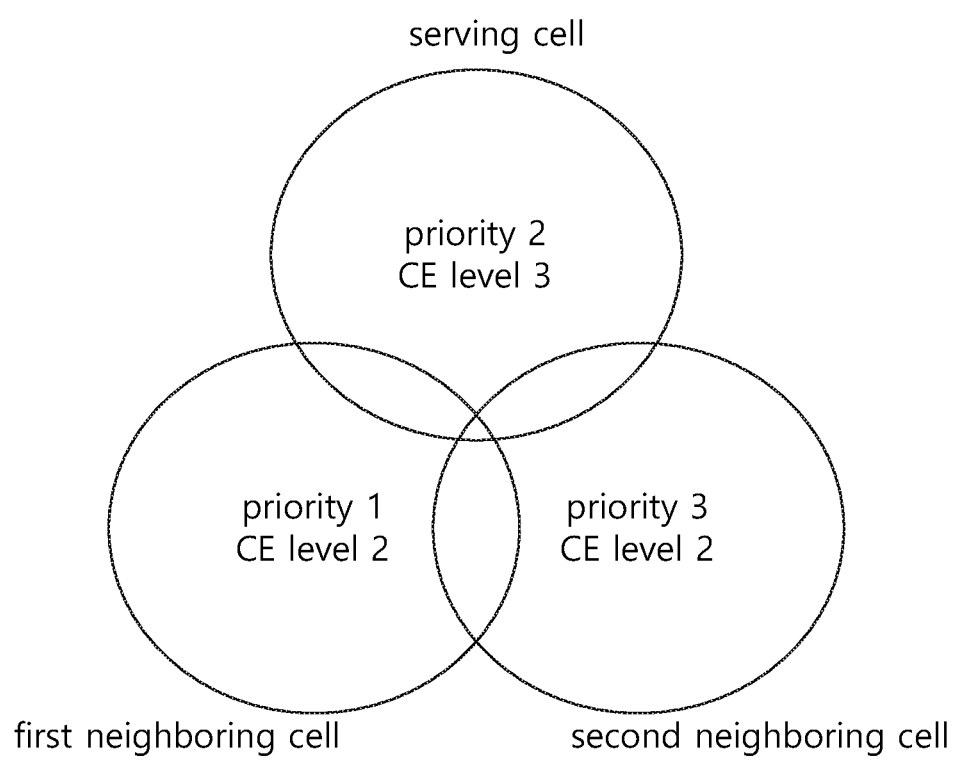
FIG. 16 shows another example of a cell reselection method considering a CE level.

Referring to FIG. 16, there are one serving cell and two neighboring cells. It is assumed that a first neighboring cell has a higher priority than a serving cell, whereas a second neighboring cell has a lower priority than the serving cell. In addition, it is assumed that a CE level is 3 as a result of measuring the serving cell, and is 2 equally as results of measuring the first neighboring cell and the second neighboring cell. In this case, since the first neighboring cell and the second neighboring cell have the same CE level, cell reselection is performed on the first neighboring cell having a higher priority than the second neighboring cell. That is, a cell of a frequency having a high priority may be selected in case of the same CE level.

2. The second method may consider not only a priority but also quality of a serving cell in the cell reselection procedure.

(1) Step 1: If an E-UTRAN frequency or inter-RAT frequency has a higher priority than a serving frequency, if one second elapses after a UE moves to a current serving cell, and if any one of the following three conditions is satisfied during a timer duration Treselection, then cell reselection may be performed on a cell at an E-UTRAN frequency or inter-RAT frequency having a higher priority.

Condition 1: reception quality (i.e., Squal) of a neighboring cell−reception quality of a serving cell>a threshold Thresh.HighQ Condition 2: reception power of a neighboring cell (i.e., Srxlev)−reception power of a serving cell>a threshold Thresh.HighP Condition 3: a CE level of a serving cell−a CE level of a neighboring cell>a threshold Thresh.HighLevel That is, at least any one of the reception quality of the serving cell, the reception power of the serving cell, and the CE level of the serving cell may be used in the cell reselection procedure. If the reception quality of the neighboring cell is greater by at least a specific value as a result of comparing the reception quality of the neighboring cell and the reception quality of the serving cell, the neighboring cell is a cell satisfying the condition of Step 1. Alternatively, if the reception power of the neighboring cell is greater by at least a specific value as a result of comparing the reception power of the neighboring cell and the reception power of the serving cell, the neighboring cell is a cell satisfying the condition of Step 1. Alternatively, if the CE level of the neighboring cell is greater by at least a specific value as a result of comparing the CE level of the neighboring cell and the CE level of the serving cell, the neighboring cell is a cell satisfying the condition of Step 1. The threshold Thresh.HighQ, the threshold Thresh.HighP, and the threshold Thresh.HighLevel may be predefined values.

Cell reselection may be performed on the cell at the E-UTRAN frequency having the same priority on the basis of a ranking for intra-frequency cell reselection.

If the E-UTRAN frequency or the inter-RAT frequency has a lower priority than the serving frequency, if one second elapses after the UE moves to a current serving cell, and if any one of the following three conditions is satisfied during a Treselection timer duration, then cell reselection may be performed on a cell at an E-UTRAN frequency or inter-RAT frequency having a lower priority.

Condition 1: reception quality (i.e., Squal) of a neighboring cell−reception quality of a serving cell>a threshold Thresh.LowQ Condition 2: reception power of a neighboring cell (i.e., Srxlev)−reception power of a serving cell>a threshold Thresh.LowP Condition 3: a CE level of a serving cell−a CE level of a neighboring cell>a threshold Thresh.LowLevel That is, at least any one of the reception quality of the serving cell, the reception power of the serving cell, and the CE level of the serving cell may be used in the cell reselection procedure. If the reception quality of the neighboring cell is greater by at least a specific value as a result of comparing the reception quality of the neighboring cell and the reception quality of the serving cell, the neighboring cell is a cell satisfying the condition of Step 1. Alternatively, if the reception power of the neighboring cell is greater by at least a specific value as a result of comparing the reception power of the neighboring cell and the reception power of the serving cell, the neighboring cell is a cell satisfying the condition of Step 1. Alternatively, if the CE level of the neighboring cell is greater by at least a specific value as a result of comparing the CE level of the neighboring cell and the CE level of the serving cell, the neighboring cell is a cell satisfying the condition of Step 1. The threshold Thresh.LowQ, the threshold Thresh.LowP, and the threshold Thresh.LowLevel may be predefined values.

(2) Step 2: For one or more cells satisfying the criterion of Step 1, the UE may perform cell reselection with an RAT/frequency required to have a minimum number of repetitions or a lowest CE level.

(3) Step 3: If there is a plurality of different cells satisfying the criterion of Step 2, cell reselection with an RAT/frequency having a high priority may be preferential over cell reselection with an RAT/frequency having a low priority.

3. The third method may consider only a ranking without having to consider a priority in the cell reselection procedure.

Cell reselection may be performed on a cell having a highest ranking among measured cells (frequencies) on a ranking basis. It may be regarded that all measured cells (frequencies) have the same priority. In other words, in the method 3, the priority is used for cell measurement, but is not used for cell reselection. A cell having a highest ranking may be a cell having a lowest CE level.

Similarly to the method 1 and the method 2, in the method 3, cell reselection may be performed on a cell having a highest ranking during a timer duration Treselection and when one second elapses after the UE moves to a current serving cell.

The method 3 may not be applied to a UE in a normal mode, and may support only a UE supporting only a CE mode and in the CE mode. That is, a UE which does not support the CE mode, or which supports the CE mode but is in a state of the normal mode may perform cell reselection by using the conventional cell reselection procedure. In the UE operating in the CE mode, a value calculated as a first threshold may not satisfy a cell selection condition, and a value calculated as a second threshold may satisfy the cell selection condition. The cell selection condition is satisfied when values Srxlev and Squal exceed 0. The first threshold is Qrxlevmin and Qqualmin for calculating the values Srxlev and Squal in normal coverage. The second threshold is Qrxlevmin_CE and Qqualmin_CE for calculating the values Srxlev and Squal in enhanced coverage. The first threshold may be greater than the second threshold. That is, the first threshold and the second threshold may be applied to Equation 2 and Equation 3 above. The UE in the CE mode may calculate Srxlev and Squal by using any one of Qrxlevmin/Qqualmin or Qrxlevmin_CE/Qqualmin_CE newly defined for CE.

A threshold used for the cell measurement/ranking may be newly defined. The threshold (e.g., Srxlev or Squal) may be different from that used in a normal cell reselection procedure (including cell measurement). Therefore, a normal mode UE residing in a current cell may select a set of certain parameters, whereas a CE mode UE residing in the current cell may select a set of other parameters.

Figure 17:
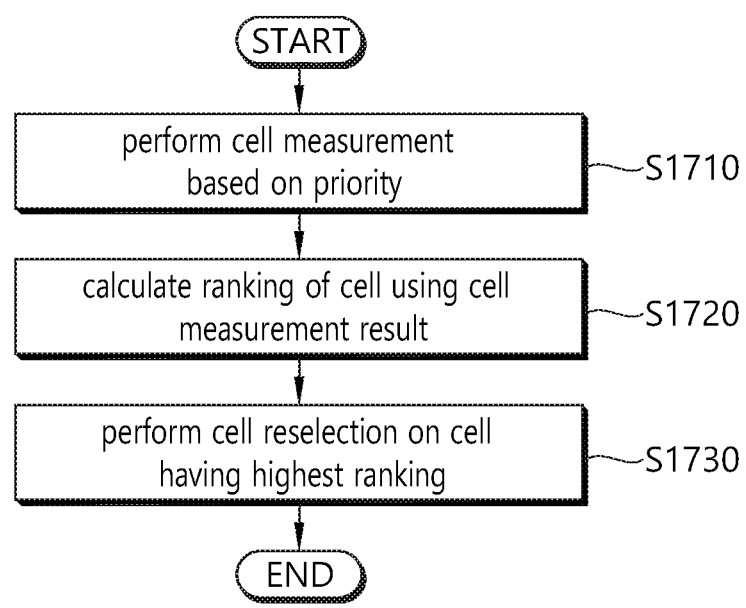
FIG. 17 is a block diagram of a method of reselecting a cell by a UE according to an embodiment of the present invention.

FIG. 17 is a block diagram of a method of reselecting a cell by a UE according to an embodiment of the present invention. The UE may not consider a priority in cell reselection.

Referring to FIG. 17, the UE may perform cell measurement on the basis of the priority (S1710). The UE may be a UE operating in a CE mode. The cell measurement may be performed in the CE mode for a longer time than in a normal mode.

The UE may calculate a ranking of a cell by using a measurement result of the measured cell (S1720).

The UE may perform the cell reselection on a cell having a highest ranking (S1730). The cell having the highest ranking may be a cell having a highest ranking among neighboring cells having a higher ranking than a serving cell. The cell reselection may be performed for a time duration Treselection when one second elapses after the UE moves to the serving cell.

Figure 18:
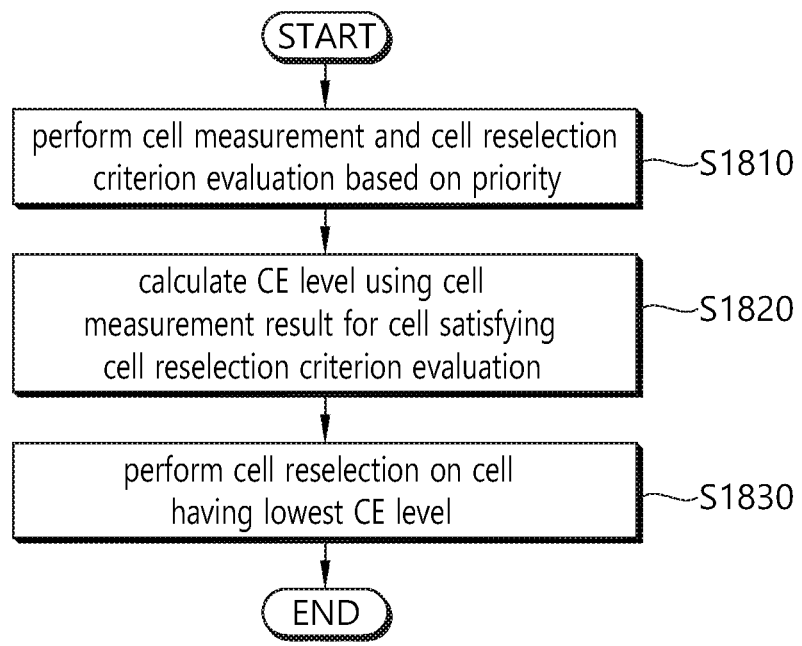
FIG. 18 is a block diagram of a method of reselecting a cell by a UE according to an embodiment of the present invention.

FIG. 18 is a block diagram of a method of reselecting a cell by a UE according to an embodiment of the present invention. The UE may perform cell reselection by considering not only a priority but also a CE level or ranking of a cell.

Referring to FIG. 18, the UE may perform cell measurement and cell reselection criterion evaluation on the basis of the priority (S1810).

The UE may be an MTC UE operating in a CE more, and the cell measurement may be performed in the CE mode for a longer time than in a normal mode.

In case of a neighboring cell having a higher priority than the serving cell, if one second elapses after the UE moves to the serving cell and if a value obtained by subtracting reception quality of the serving cell from reception quality of the neighboring cell is greater than a threshold Thresh, HighQ during the timer duration Treselection, then the neighboring cell may be a cell satisfying the cell reselection criterion evaluation. Alternatively, in case of the neighboring cell having the higher priority than the serving cell, if one second elapses after the UE moves to the serving cell and if a value obtained by subtracting the reception power of the serving cell from the reception power of the neighboring cell is greater than a threshold Thresh,HighP during the timer duration Treselection, then the neighboring cell may be a cell satisfying the cell reselection criterion evaluation. Alternatively, in case of the neighboring cell having the higher priority than the serving cell, if one second elapses after the UE moves to the serving cell and if a value obtained by subtracting a CE level of the neighboring cell from a CE level of the serving cell is greater than a threshold Thresh, HighLevel during the timer duration Treselection, then the neighboring cell may be a cell satisfying the cell reselection criterion evaluation. The timer Treselection, the threshold Thresh,HighQ, the threshold Thresh,HighP, and threshold Thresh,HighLevel may be received from the serving cell.

In case of a neighboring cell having a lower priority than the serving cell, if one second elapses after the UE moves to the serving cell and if a value obtained by subtracting reception quality of the serving cell from reception quality of the neighboring cell is greater than a threshold Thresh, LowQ during the timer duration Treselection, then the neighboring cell may be a cell satisfying the cell reselection criterion evaluation. Alternatively, in case of the neighboring cell having the lower priority than the serving cell, if one second elapses after the UE moves to the serving cell and if a value obtained by subtracting the reception power of the serving cell from the reception power of the neighboring cell is greater than a threshold Thresh,LowP during the timer duration Treselection, then the neighboring cell may be a cell satisfying the cell reselection criterion evaluation. Alternatively, in case of the neighboring cell having the lower priority than the serving cell, if one second elapses after the UE moves to the serving cell and if a value obtained by subtracting a CE level of the neighboring cell from a CE level of the serving cell is greater than a threshold Thresh, LowLevel during the timer duration Treselection, then the neighboring cell may be a cell satisfying the cell reselection criterion evaluation. The timer Treselection, the threshold Thresh,LowQ, the threshold Thresh,LowP, and threshold Thresh,LowLevel may be received from the serving cell.

The UE may calculate the CE level by using a cell measurement result with respect to the cell satisfying the cell reselection criterion evaluation (S1820).

The CE level may be calculated on the basis of measured reference signal received quality (RSRQ) or reference signal received power (RSRP), and a cell having the lowest CE level may be a cell having the best measured RSRQ or RSRP among cells satisfying the cell reselection criterion evaluation. The CE level may be calculated on the basis of a time for obtaining a primary synchronization signal (PSS) or a secondary synchronization signal (SSS), and a cell having the lowest CE level may be a cell having a smallest time for obtaining the PSS or the SSS among the cells satisfying the cell reselection criterion evaluation. The CE level may be calculated on the basis of the number of repetitions for receiving a downlink message, and the cell having the lowest CE level may be a cell having the smallest number of repetitions for receiving the downlink message among the cells satisfying the cell reselection criterion evaluation. The CE level may be calculated on the basis of the number of repetitions for transmitting an uplink message, and the cell having the lowest CE level may be a cell having the smallest number of repetitions for transmitting the uplink message among the cells satisfying the cell reselection criterion evaluation.

The UE may perform cell reselection on a cell having a lowest CE level (S1830).

The cell having the lowest CE level may be a cell having a highest ranking. If there is a plurality of cells having a lowest CE level, the cell having the lowest CE level may be a cell having a top priority among the cells having the lowest CE level.

Figure 19:
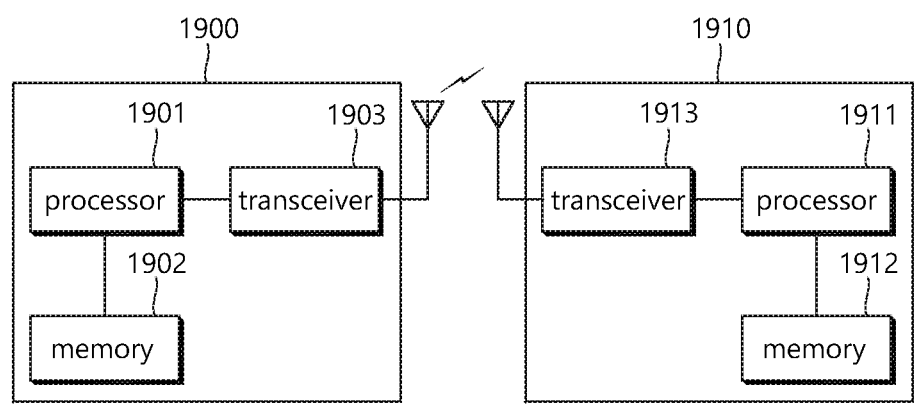
FIG. 19 is a block diagram illustrating a wireless communication system according to the embodiment of the present invention.

FIG. 19 is a block diagram illustrating a wireless communication system according to the embodiment of the present invention.

A BS 1900 includes a processor 1901, a memory 1902 and a transceiver 1903. The memory 1902 is connected to the processor 1901, and stores various information for driving the processor 1901. The transceiver 1903 is connected to the processor 1901, and transmits and/or receives radio signals. The processor 1901 implements proposed functions, processes and/or methods. In the above embodiment, an operation of the base station may be implemented by the processor 1901.

A UE 1910 includes a processor 1911, a memory 1912 and a transceiver 1913. The memory 1912 is connected to the processor 1911, and stores various information for driving the processor 1911. The transceiver 1913 is connected to the processor 1911, and transmits and/or receives radio signals. The processor 1911 implements proposed functions, processes and/or methods. In the above embodiment, an operation of the UE may be implemented by the processor 1911.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method performed by a wireless device in a wireless communication system, the method comprising:
   receiving information on a frequency priority of a serving frequency and a frequency priority of an inter-frequency different from the frequency priority of the serving frequency;
   performing a measurement for a first cell on the serving frequency and a measurement for a second cell on the inter-frequency; and
   while the wireless device is in an enhanced coverage:
   determining a ranking of the first cell on the serving frequency based on a result of the measurement for the first cell, and a ranking of the second cell on the inter-frequency based on a result of the measurement for the second cell;
   performing a comparison between the ranking of the first cell on the serving frequency and the ranking of the second cell on the inter-frequency; and
   performing a cell reselection to a cell that is determined as a best ranked cell among the first cell and the second cell based on a result of the comparison.

2. The method of claim 1, wherein the performing of the cell reselection comprises performing a cell reselection to the best ranked cell when the cell has a higher ranking than a serving cell during a timer duration and when a specific time duration elapses after the UE moves to the serving cell.

3. The method of claim 1, wherein the performing of the cell reselection comprises performing a cell reselection to the best ranked cell without considering the frequency priority of the serving frequency and the frequency priority of the inter-frequency.

4. The method of claim 1, wherein the best ranked cell is determined among neighboring cells having a higher ranking than a serving cell for the wireless device.

5. The method of claim 1, wherein the determining of the ranking of the second cell comprises:
   determining whether the second cell meets a first threshold that does not satisfy a cell selection condition or a second threshold that does satisfy the cell selection condition.

6. The method of claim 5, wherein the cell selection condition is satisfied when values Srxlev and Squal exceed 0,
   wherein the first threshold is Qrxlevmin and Qqualmin for obtaining the values Srxlev and Squal in normal coverage,
   wherein the second threshold is Qrxlevmin_CE and Qqualmin_CE for obtaining the values Srxlev and Squal in enhanced coverage, and
   wherein the first threshold is greater than the second threshold.

7. The method of claim 1, wherein the performing of the measurement comprises:
   measuring a cell in the enhanced coverage for a longer time than in a normal mode.

8. A wireless device in a wireless communication device, the wireless device comprising:
   a memory; a transceiver; and at least one processor operatively coupled to the memory and the transceiver, wherein the at least one processor is configured to:
   control the transceiver to receive information on a frequency priority of a serving frequency and a frequency priority of an inter-frequency different from the frequency priority of the serving frequency,
   perform a measurement for a first cell on the serving frequency and a measurement for a second cell on the inter-frequency, and
   while the wireless device is in an enhanced coverage:
   determine a ranking of the first cell on the serving frequency based on a result of the measurement for the first cell, and a ranking of the second cell on the inter-frequency based on a result of the measurement for the second cell,
   perform a comparison between the ranking of the first cell on the serving frequency and the ranking of the second cell on the inter-frequency, and perform a cell reselection to a cell that is determined as a best ranked cell among the first cell and the second cell based on a result of the comparison.

9. The wireless device of claim 8, wherein the at least one processor is configured to perform a cell reselection to the best ranked cell when the cell has a higher ranking than a serving cell during a timer duration and when a specific time duration elapses after the UE moves to the serving cell.

10. The wireless device of claim 8, wherein the at least one processor is configured to perform a cell reselection to the best ranked cell without considering the frequency priority of the serving frequency and the frequency priority of the inter-frequency.

11. The wireless device of claim 8, wherein the best ranked cell is determined among neighboring cells having a higher ranking than a serving cell for the wireless device.

12. The wireless device of claim 8, wherein the at least one processor is configured to determine whether the second cell meets a first threshold that does not satisfy a cell selection condition or a second threshold that does satisfy the cell selection condition.

13. The wireless device of claim 12, wherein the cell selection condition is satisfied when values Srxlev and Squal exceed 0,
wherein the first threshold is Qrxlevmin and Qqualmin for obtaining the values Srxlev and Squal in normal coverage,
wherein the second threshold is Qrxlevmin_CE and Qqualmin_CE for obtaining the values Srxlev and Squal in enhanced coverage, and
wherein the first threshold is greater than the second threshold.

14. The wireless device of claim 8, wherein the at least one processor is configured to measure a cell in the enhanced coverage for a longer time than in a normal mode.

15. The method of claim 1, further comprising:
communicating with a base station via the cell to which the cell reselection is performed.

16. The wireless device of claim 8, wherein the transceiver is configured to communicate with a base station via the cell to which the cell reselection is performed.

17. The method of claim 1, wherein the frequency priority of the inter-frequency is higher than the frequency priority of the serving frequency.

18. The method of claim 1, further comprising:
determining a ranking of a cell on a first inter-frequency and a ranking of a cell on a second inter-frequency whose frequency priority is different from that of the first inter-frequency;
performing a ranking comparison between the ranking of the cell on the first inter-frequency and the ranking of the cell on the second inter-frequency; and
performing a cell reselection based on the ranking comparison.

19. The wireless device of claim 8, wherein the frequency priority of the inter-frequency is higher than the frequency priority of the serving frequency.

20. The wireless device of claim 8, wherein the at least one processor is further configured to:
determine a ranking of a cell on a first inter-frequency and a ranking of a cell on a second inter-frequency whose frequency priority is different from that of the first inter-frequency,
perform a ranking comparison between the ranking of the cell on the first inter-frequency and the ranking of the cell on the second inter-frequency, and
perform a cell reselection based on the ranking comparison.

* * * * *